US012728586B2

(12) United States Patent
Nadler et al.

(10) Patent No.: US 12,728,586 B2
(45) Date of Patent: Sep. 8, 2026

(54) METHODS AND SYSTEMS OF OBTAINING PATTERNED STRUCTURES ON SURFACES

(71) Applicant: Georgia Tech Research Corporation, Atlanta, GA (US)

(72) Inventors: Jason Hayes Nadler, Atlanta, GA (US); Katherine E. Copenhaver, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 318 days.

(21) Appl. No.: 17/773,541

(22) PCT Filed: Oct. 29, 2020

(86) PCT No.: PCT/US2020/058059
§ 371 (c)(1),
(2) Date: Apr. 29, 2022

(87) PCT Pub. No.: WO2021/087172
PCT Pub. Date: May 6, 2021

(65) Prior Publication Data

US 2022/0379544 A1 Dec. 1, 2022

Related U.S. Application Data

(60) Provisional application No. 62/927,633, filed on Oct. 29, 2019.

(51) Int. Cl.
*B29C 35/08* (2006.01)
*B29C 59/00* (2006.01)
(Continued)

(52) U.S. Cl.
CPC .......... *B29C 59/04* (2013.01); *B29C 35/0805* (2013.01); *B29C 59/002* (2013.01); *B29C 2035/0827* (2013.01); *B29K 2105/162* (2013.01)

(58) Field of Classification Search
CPC ..... B29C 39/148; B29C 59/04; G03F 7/0002; G03F 7/0037; B05D 1/18; B05D 1/28;
(Continued)

(56) References Cited

U.S. PATENT DOCUMENTS 3,919,378 A * 11/1975 Smarook ............ A44B 18/0053 264/293
2003/0215577 A1* 11/2003 Willson ................ B82Y 10/00 118/503
(Continued)

FOREIGN PATENT DOCUMENTS

JP 2004118119 A * 4/2004
WO 2003/076076 A2 9/2003

OTHER PUBLICATIONS

Lee et al., Drawing lithography for microneedles: A review of fundamentals and biomedical applications, Biomaterials, vol. 33, Issue 30, 2012, pp. 7309-7326, ISSN 0142-9612, https://doi.org/10.1016/j.biomaterials.2012.06.065. (Year: 2012).*
(Continued)

*Primary Examiner* — Susan D Leong
*Assistant Examiner* — Jennifer L Groux
(74) *Attorney, Agent, or Firm* — TROUTMAN PEPPER LOCKE LLP; Ryan A. Schneider; Stephanie J. Remy

(57) ABSTRACT

Method for producing arrays of free standing, three dimensional structures on material surfaces by establishing contact with a template, moving the template and the surface in contact relative to one another, inducing an increase in viscosity such that the structures are self-supported, and removing the template, leaving a negative of the template geometry at the tip of the object.

19 Claims, 18 Drawing Sheets

(51) Int. Cl.
*B29C 59/04* (2006.01)
*B29K 105/16* (2006.01)

(58) Field of Classification Search
CPC .... B05D 1/40; B05D 1/42; A61M 2037/0053; B81C 1/00444; B81C 1/0046; B81C 1/00111; B81C 1/00214
See application file for complete search history.

(56) References Cited

U.S. PATENT DOCUMENTS

| | | | | |
|---|---|---|---|---|
| 2009/0053472 | A1* | 2/2009 | Spatz | B29C 59/025 264/293 |
| 2009/0084492 | A1* | 4/2009 | Chou | B82Y 40/00 156/196 |
| 2010/0114043 | A1* | 5/2010 | Jung | A61M 37/0015 427/2.3 |
| 2012/0052286 | A1* | 3/2012 | Norwood | B82Y 25/00 428/323 |
| 2015/0021161 | A1 | 1/2015 | Johnson et al. | |
| 2017/0327935 | A1* | 11/2017 | Hasan | B22F 1/08 |
| 2018/0006176 | A1* | 1/2018 | Pau | H01L 31/0504 |
| 2018/0252999 | A1 | 9/2018 | Stachowiak et al. | |
| 2021/0162682 | A1* | 6/2021 | Speaker | C08L 5/00 |

OTHER PUBLICATIONS

International Search Report and Written Opinion from Application No. PCT/US2020/058059 dated Jan. 28, 2021.

* cited by examiner

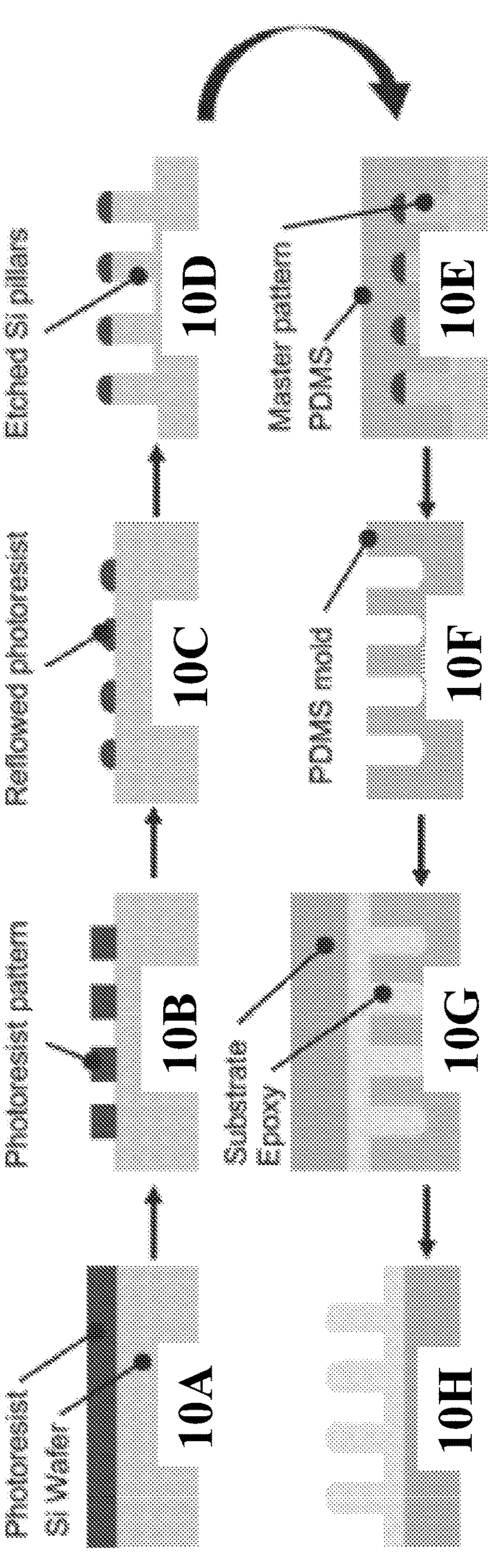
FIGS. 10A-10H

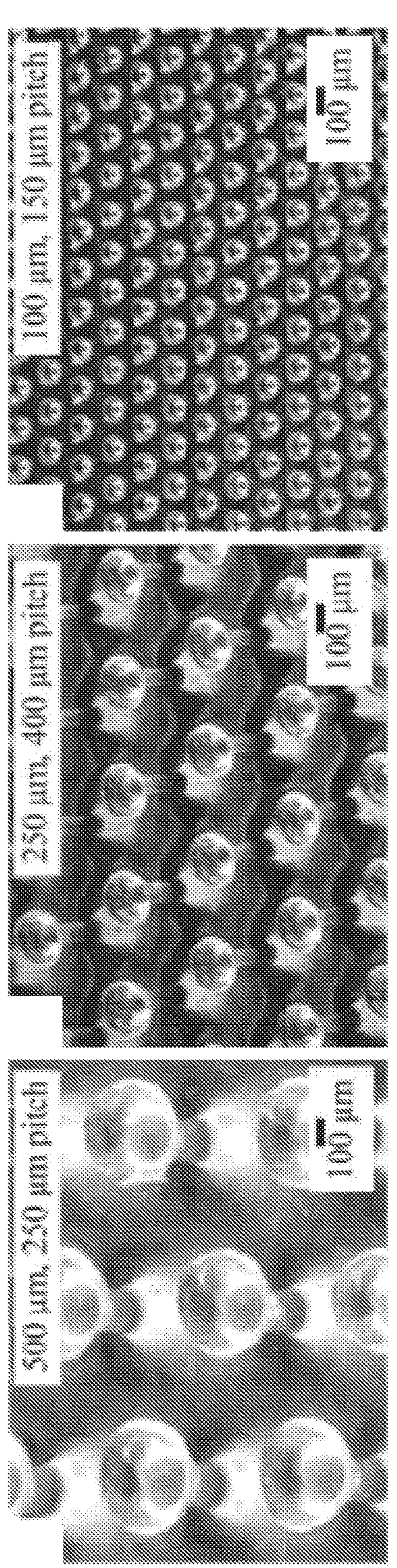
FIG. 16C
FIG. 16B
FIG. 16A

METHODS AND SYSTEMS OF OBTAINING PATTERNED STRUCTURES ON SURFACES

CROSS-REFERENCE TO RELATED APPLICATIONS

This application claims the benefit of U.S. Provisional Patent Application No. 62/927,633 filed 29 Oct. 2019, the entire contents and substance of which are hereby incorporated by reference as if fully set forth below.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Disclosure

The various exemplary embodiments of the disclosure relate generally to fabricating arrays of high aspect ratio structures. It is particularly related to extensional deformation processes that draw templated patterns from viscous or viscoelastic material surfaces.

2. Background

Surface structures or patterns in thermoplastic polymers or thermosetting resins are commonly prepared using photo lithographically patterned templates as molds to create high aspect ratio (AR) fibrillar or columnar structures. A distinct geometry such as a dome or wide flat plate can be added to these high AR molded structures either by molding them directly or by adding a secondary dipping process subsequent to molding.

Other methods that have been explored to fabricate high aspect ratio arrayed structures from the macro- to the nano-scale include stretching imprint molding, direct molding, electrically induced deformation, and drawing lithography.

To prepare a mold using photolithography, a substrate with a layer of photosensitive polymer, or photoresist, is partially exposed to ultra-violet (UV) irradiation through a pre-patterned mask. Photoresists and their accompanying lithographic techniques can be described either as positive or negative.

A positive-tone photoresist comprises a polymer that undergoes chain scission in response to UV light, meaning that the areas exposed through the mask will be removed after exposure. The molecular chains of negative-tone photoresists polymerize or cross link upon exposure to UV light, meaning the areas exposed to UV through the mask will remain after exposure, and all areas covered by the mask will be removed. Essentially, a positive-tone photoresist replicates the structure of the photomask, while negative-tone photoresists replicate the inverse of the photomask.

Photolithography is often combined with deep reactive-ion etching (DRIP, an anisotropic etch technique, in order to increase the aspect ratios of patterned holes in photoresist on a silicon wafer. High-AR molds of this nature are known. They are used to make positive fibrillar or columnar array of structures with diameters ranging from hundreds of nanometers to hundreds of microns. The maximum height achieved by molding with a photolithographically prepared template is typically 100-150 μm due to the limitations in the thickness of silicon wafers and photoresist layers that can be achieved. Most often, polymer resins such as polydimethylsiloxane (PDMS) or polyvinylsiloxane (PVS) are used as the molding material. PDMS and similar resins have a relatively low viscosity and are typically cured by applying heat or UV light.

Thermoplastic polymers are seldom used to fabricate high aspect ratio structure arrays at the micro-scale. This is largely due to the high viscosity of polymer melts, in comparison to that of a thermosetting resin. For example, typical PDMS resin has been shown to have a viscosity of 25 centipoise (cP) at room temperature, whereas commercial polystyrene has been found to have a zero shear viscosity of 0.2 megapoise (MP) at 200° C. The high viscosity of polymer melts relative to typical thermosetting resins makes it more difficult to infiltrate molds with sub-mm features, which can lead to a high degree of defects in the molded structure array.

A last method for fabricating high aspect ratio structures on polymer surfaces is through the drawing of uncured liquids or molten polymers. This technique, which goes by various terms including "direct drawing," "the liquid bridge process," and, most popularly, "drawing lithography," has been utilized most often in recent literature for producing microneedles as an alternative to oral medication and conventional syringes for drug delivery.

Microneedles are typically produced via drawing lithography by heating a thermoplastic polymer film above its melting temperature. A patterned substrate is then brought into contact with the molten film, and the system is then cooled below the melting temperature of the polymer, increasing the polymer's viscosity. The pattern is then raised at a fixed rate, "pulling" with it the wetted polymer and forming columns that are thinned and stretched as the pattern continues to rise. Once the pattern reaches a desired height, the system is cooled below the glass transition temperature of the polymer, and further ascension of the pattern breaks the polymeric bridges at the point where the necks were thinnest, resulting in sharp tips. This process can also be performed with a viscous polymer resin that can be cured after drawing by UV irradiation or some other means.

Drawing lithography has seen use most recently to produce structures beyond microneedles. Microhooks have been produced via drawing lithography for adhesion inspired by the attachment mechanisms of intestinal parasites. Structures similar to needles were drawn, but the draw rate and heating and cooling schedule was optimized such that the tips of the structures sag to one side and form a hook.

High aspect ratio micropillars topped with microspheres have been produced via drawing lithography and used as waveguides. Arrays of 58 μm diameter gold-coated glass microspheres were assembled on a photo lithographically patterned grid and transferred onto a piece of double stick tape on a glass slide. The microsphere array was then attached microsphere-side-down to a motor and was placed above a substrate with a film of uncured PDMS. The temperature of the bottom substrate was raised in order to increase the viscosity of PDMS, and the microsphere array was then brought into contact with the film. After a predetermined dwelling period, the microsphere array was drawn upward, drawing with it high aspect ratio PDMS micropillars. The PDMS was then cured and the double stick tape was removed, leaving the microspheres as caps for the PDMS pillars. The pillars were drawn to approximately 880 μm on average, with a minimum diameter of 14 μm and a maximum diameter of 30 μm at the base.

Yet any process that relies heavily on photolithography is undesirable. A majority of the photolithography process can only be done in a cleanroom on a wafer scale. Additionally, processes requiring UV curing are generally not industrially viable. Drawing lithography with molten polymers is the simplest of the fabrication methods discussed above, only requiring heaters, a polymer film, and a pattern on a motorized stage. While drawing lithography has gained attention recently for the production of microneedles and similar shapes, any attempts to fabricate structures with tip shapes other than sharp points have not been reported.

Additionally, the conventional processes are not versatile, nor can they change length scales easily. Conventional systems utilize single-use templates. Some have worked on electro-hydrodynamic drawing techniques, but only somewhat successfully on the nanoscale.

A need exists for improved fabrication processes for high aspect ratio structures. A need yet exists for a process that rather easily and repeatedly can draw structures on a wide range of length scales (for example, from mm-scale to μm-scale) just by changing re-useable templates. Through the present inventive drawcasting process, structures with defined tip geometry like those typically produced by molding can be produced on a larger scale and in a wider variety of materials including thermosetting resins and thermoplastics. The addition of a patterned top heater extends the usefulness and application space of drawing lithography beyond the production of microneedle arrays for biomedical applications.

BRIEF SUMMARY OF THE DISCLOSURE

In an exemplary embodiment of the present invention, an innovative process of drawcasting provides an extensional deformation process that draws templated patterns from the viscous or a viscoelastic phase of the parent material. Viscous polymer or monomer resins are drawn up by a template until the resultant capillary bridges narrow to produce arrays of drawn structures.

In an exemplary embodiment of the present invention, the fabrication process produces surfaces with micron-scaled elevated concave structures without direct molding.

The present invention comprises processes and systems configured to perform the processes.

In another exemplary embodiment of the present invention, a method of structure formation from a viscous composition comprises changing the relative distance between a template and an upper surface of a viscous composition with first flow characteristics from a distal position to a proximate position closer than the distal position, and forming free-standing structures of the viscous composition with second flow characteristics, the structures extending a height from a base portion to a tip portion, wherein second flow characteristics of the viscous composition comprise rheological properties that are sufficient to retain the structure as free-standing.

Forming free-standing structures can comprise drawing portions of the viscous composition with the first flow characteristics into physical contact with the surface of the template at respective locations of contact, and removing the physical contact of the portions of the viscous composition and the template, wherein upon removing the physical contact, the drawn portions of the viscous composition form the free-standing structures, and wherein the tip portions of at least a portion of the free-standing structures each have a shape based at least in part by the respective shape of the location of contact of the respective drawn portions of the viscous composition in prior physical contact with the contact surface.

One of the first flow characteristics can be a first viscosity of the viscous composition, wherein one of the second flow characteristics can be a second viscosity of the viscous composition, and wherein the second viscosity is higher than the first viscosity.

The method can further comprise tuning an average aspect ratio of the free-standing structures based at least in part by surface tension properties and extensional properties of the viscous composition.

Forming the free-standing structures can further comprises increasing the relative distance between the template and the upper surface of the viscous composition.

The template can be a patterned template, the patterned surface of the template defining the locations of contact of the viscous composition with the template.

Drawing portions of the viscous composition into physical contact with the patterned surface can comprise forming a meniscus on the patterned surface.

Increasing the relative distance between the template and the upper surface of the viscous composition can comprise lifting the template while the viscous composition remains in physical contact with the template, forming capillary bridges dynamically supported by both surface tension and the viscous forces opposing gravity.

Removing the physical contact of the capillary bridges of viscous composition and the template can comprise release of the viscous composition with the second flow characteristics.

Release of the viscous composition from the template can comprise change in properties of the viscous composition during solidification of the viscous composition.

Release of the viscous composition from the template can comprise application of a release agent to the patterned surface.

In another exemplary embodiment of the present invention, a method of structure formation from a viscous composition comprises changing the relative distance between a template and an upper surface of a viscous composition with first flow characteristics from a distal position to a proximate position closer than the distal position, drawing portions of the viscous composition with the first flow characteristics into physical contact with the surface of the template at respective locations of contact, and removing the physical contact of the portions of the viscous composition and the template, wherein upon removing contact, the drawn portions of the viscous composition form free-standing structures of the viscous composition with second flow characteristics, each structure extending a height from a base portion to a tip portion, wherein second flow characteristics of the viscous composition comprise rheological properties that are sufficient to retain the structures as free-standing, and wherein the tip portions of at least a portion of the free-standing structures each have a shape based at least in part by the respective shape of the location of contact of the respective drawn portions of the viscous composition in prior physical contact with the contact surface.

The first flow characteristics of the viscous composition can transition to the second flow characteristics of the viscous composition via the application of UV energy to the viscous composition.

The first flow characteristics of the viscous composition can transition to the second flow characteristics of the viscous composition via cooling the viscous composition.

The first flow characteristics of the viscous composition can transition to the second flow characteristics of the viscous composition via curing the viscous composition.

The first flow characteristics of the viscous composition can transition to the second flow characteristics of the viscous composition via crosslinking in the viscous composition.

The first flow characteristics of the viscous composition can transition to the second flow characteristics of the viscous composition via removal of a solvent of the viscous composition.

The viscous composition can be composite material comprising particles selected from the group consisting of microparticles and nanoparticles.

The particles can have properties selected from the group consisting of conductivity, magnetism, and optical.

The viscous composition can be composite material comprising particles selected from the group consisting of microparticles and nanoparticles, and wherein at least one property of the particles facilitates drawing portions of the viscous composition with the first flow characteristics into physical contact with the surface of the template at respective locations of contact.

The viscous composition can be a composite material comprising particles selected from the group consisting of microparticles and nanoparticles, and wherein at least one property of the particles facilitates removing the physical contact of the portions of the viscous composition and the template.

The template can be a patterned template, the patterned surface of the template defining the locations of contact of the viscous composition with the template.

The patterned surface of the template can comprise template structures.

The template structures forming the patterned surface of the template can have a common shape. A portion of the template structures can have a first shape and a portion of the template structures can have a second shape. Multiple portions of the template structures can have one of a multiple different shapes, wherein each multiple portion has the same shape among its portion, but a different shape from the other multiple portions. Each template structure can have a different shape from every other template structure.

The template structures forming the patterned surface of the template can have a common size. A portion of the template structures can have a first size and a portion of the template structures can have a second size. Multiple portions of the template structures can have one of a multiple different sizes, wherein each multiple portion has the same size among its portion, but a different size from the other multiple portions. Each template structure can have a different size from every other template structure.

The template structures forming the patterned surface of the template can have a common spacing one from another. A portion of the template structures can have a first spacing and a portion of the template structures can have a second spacing. Multiple portions of the template structures can have one of a multiple different spacings, wherein each multiple portion has the same spacing among its portion, but a different spacing from the other multiple portions. The spacing between any two template structures can be different.

In another exemplary embodiment of the present invention, a method of structure formation from a viscous composition comprises changing the relative distance between a template and an upper surface of a viscous composition with first flow characteristics from a distal position to a proximate position closer than the distal position, drawing portions of the viscous composition with the first flow characteristics into physical contact with the surface of the template at respective locations of contact, and removing the physical contact of the portions of the viscous composition and the template, wherein upon removing contact, the drawn portions of the viscous composition form free-standing structures of the viscous composition with second flow characteristics, each structure extending a height from a base portion to a tip portion, wherein second flow characteristics of the viscous composition comprise rheological properties that are sufficient to retain the structures as free-standing, and wherein the tip portions of at least a portion of the free-standing structures each have a shape based at least in part by the respective shape of the location of contact of the respective drawn portions of the viscous composition in prior physical contact with the contact surface.

Drawing portions of the viscous composition into contact of the surface of the template at the locations of contact can comprise bringing the locations of contact of the template and the upper surface of the viscous composition into physical contact.

The proximate position of the template relative the upper surface of the viscous composition can comprise a gap between the template and the upper surface of the viscous composition, the gap presenting a physical separation between the template and the upper surface of the viscous composition.

Drawing portions of the viscous composition into contact of the surface of the template at the locations of contact can comprise providing or applying a voltage difference between template and the viscous composition sufficient to draw the portions of the viscous composition through the gap and into physical contact of the surface of the template at the respective locations of contact.

Removing the physical contact of the portions of the viscous composition and the template can comprise increasing the relative distance between the template and the upper surface of the viscous composition.

In another exemplary embodiment of the present invention, a method of structure formation from a viscous composition comprises changing the relative distance between a template and an upper surface of a viscous composition with first flow characteristics, one of which is a first viscosity, from a distal position to a proximate position closer than the distal position, drawing portions of the viscous composition at the first viscosity into physical contact with the surface of the template at locations of contact, extending a height of each of at least a portion of the drawn portions of the viscous composition from a base portion at the upper surface of the viscous composition to a tip portion in physical contact with the surface of the template at the location of contact, and removing the physical contact of the tip portions of the extended drawn portions of the viscous composition with second flow characteristics and the template, wherein second flow characteristics of the viscous composition comprise rheological properties that are sufficient to retain the structures as free-standing, wherein upon removing physical contact, the drawn portions of the viscous composition form the free-standing structures of the viscous composition, each structure extending a height from the base portion to the tip portion, and wherein the tip portions of at least a portion of the free-standing structures each have a shape based at least in part by the respective shape of the location of contact of the respective drawn portions of the viscous composition in prior physical contact with the contact surface.

Extending the height of the drawn portions of the viscous composition can comprise increasing the relative distance between the template and the upper surface of the viscous composition.

Removing the physical contact of the tip portions and the template can comprise further increasing the relative distance between the template and the upper surface of the viscous composition until the tip portions and the template are no longer in physical contact.

During extending the heights of the drawn portions, the viscous composition can undergo a process of solidification.

The process of solidification can end in a solid state of the viscous composition, although it need not.

Removing physical contact of the viscous composition from the template can comprise the facture of the solid state of the viscous composition in proximity to the tip portion of the drawn portions.

Removing physical contact of the viscous composition from the template can comprise change in properties of the viscous composition during solidification of the viscous composition.

Removing physical contact of the viscous composition from the template can comprise application of a release agent to at the locations of contact of the template.

At least a portion of the free-standing structures can have an aspect ratio of greater than approximately 1.9. At least a portion of the free-standing structures can have an aspect ratio of greater than approximately 2.6. At least a portion of the free-standing structures can have an aspect ratio of greater than approximately 3.1. At least a portion of the free-standing structures can have an aspect ratio of greater than approximately 6.7. At least a portion of the free-standing structures can have an aspect ratio of greater than approximately 9.6.

Another exemplary embodiment of the present invention comprises a method of structure formation from a viscous composition comprising changing the relative distance between a template and an upper surface of a viscous composition with a first viscosity from a distal position to a proximate position closer than the distal position, and forming free-standing structures of the viscous composition at a second viscosity higher than the first viscosity, the structures extending a height from a base portion to a tip portion.

Forming free-standing structures can comprise drawing portions of the viscous composition at the first viscosity into physical contact with the surface of the template at respective locations of contact, and removing the physical contact of the portions of the viscous composition and the template, wherein upon removing the physical contact, the drawn portions of the viscous composition form the free-standing structures, and wherein the tip portions of at least a portion of the free-standing structures each have a shape based at least in part by the respective shape of the location of contact of the respective drawn portions of the viscous composition in prior physical contact with the contact surface.

The present invention enables fine tuning of structure aspect ratios mainly defined (limited) by surface tension qualities and extensional properties of the drawn material, and can be controlled over a wide ratio from, for example, less than 1 to over 10. At least a portion of the free-standing structures can have an aspect ratio of greater than approximately 1.9, more preferably greater than approximately 2.6, more preferably greater than approximately 3.1, more preferably greater than approximately 6.7, and most preferably greater than approximately 9.6.

Another exemplary embodiment of the present invention comprises a method of structure formation from a viscous composition comprising changing the relative distance between a template and an upper surface of a viscous composition with a first viscosity from a distal position to a proximate position closer than the distal position, drawing portions of the viscous composition at the first viscosity into physical contact with the surface of the template at respective locations of contact, and removing the physical contact of the portions of the viscous composition and the template, wherein upon removing contact, the drawn portions of the viscous composition form free-standing structures of the viscous composition at a second viscosity higher than the first viscosity, each structure extending a height from a base portion to a tip portion, and wherein the tip portions of at least a portion of the free-standing structures each have a shape based at least in part by the respective shape of the location of contact of the respective drawn portions of the viscous composition in prior physical contact with the contact surface.

Drawing portions of the viscous composition into contact of the surface of the template at the locations of contact can comprise bringing the locations of contact of the template and the upper surface of the viscous composition into physical contact.

The proximate position of the template relative the upper surface of the viscous composition can comprise a gap between the template and the upper surface of the viscous composition, the gap presenting a physical separation between the template and the upper surface of the viscous composition, and wherein drawing portions of the viscous composition into contact of the surface of the template at the locations of contact comprises providing a voltage difference between the upper surface of the viscous composition and the template sufficient to draw the portions of the viscous composition through the gap and into physical contact of the surface of the template at the respective locations of contact.

Removing the physical contact of the portions of the viscous composition and the template can comprise increasing the relative distance between the template and the upper surface of the viscous composition.

Another exemplary embodiment of the present invention comprises a method of structure formation from a viscous composition comprising changing the relative distance between a template and an upper surface of a viscous composition with a first viscosity from a distal position to a proximate position closer than the distal position, drawing portions of the viscous composition at the first viscosity into physical contact with the surface of the template at locations of contact, extending a height of each of at least a portion of the drawn portions of the viscous composition from a base portion at the upper surface of the viscous composition to a tip portion in physical contact with the surface of the template at the location of contact, and removing the physical contact of the tip portions of the extended drawn portions of the viscous composition and the template, wherein upon removing physical contact, the drawn portions of the viscous composition form free-standing structures of the viscous composition at a second viscosity higher than the first viscosity, each structure extending a height from the base portion to the tip portion, and wherein the tip portions of at least a portion of the free-standing structures each have a shape based at least in part by the respective shape of the location of contact of the respective drawn portions of the viscous composition in prior physical contact with the contact surface.

Extending the height of the drawn portions of the viscous composition can comprise increasing the relative distance between the template and the upper surface of the viscous composition, and wherein removing the physical contact of the tip portions and the template can comprise increasing the relative distance between the template and the upper surface of the viscous composition until the tip portions and the template are no longer in physical contact.

At least a portion of the free-standing structures can have an aspect ratio of from less than 1 through a range of greater than 10. An innovative feature of the present invention is the ability to tune aspect ratio without the necessity of a disruptive retooling or new process, as the current invention can work with a myriad of compositions, with vastly different chemistries, that can be chosen for a particular surface tension and extensional property so the resultant structures not only generally have desired overall shapes, but more specifically have a desired aspect ratio.

The viscous composition can comprise many materials, mainly defined by a beneficial viscosity and surface tension either existing in the material itself, or where these parameters of the material can be brought into ranges (by changing temperature, pressure, degree of curing or crosslinking, removal of solvent, etc.) such that the same material can at a first time (i) make contact and adhere to the template and be deformed by that template, and at a second, subsequent time (ii) is sufficient such that the structures at the desired aspect ratio can stand on their own. That is, the material (in exemplary embodiments chemically the same at all times, but in alternative embodiments may not be—additives can alter the chemistry of the material in one or more steps) needs to be able to perform both functions (i) and (ii), albeit at different times, and with control systems by some external means (time, temperature, atmosphere, pressure, UV, etc.).

Exemplary materials can be monolithic (e.g., thermoplastics, uncured thermosets/resins, polymer solutions—polymer dissolved in volatile solvent), and/or the material being deformed can contain multiple compositions (e.g., polymer blends [homogeneous or phase-separated], block copolymers, polymer solutions with multiple polymers, multi-layer materials, materials loaded with micro- or nanoparticles with inherent properties such as conductivity/magnetism/application-specific properties such as optical).

Those of skill in the art will understand that the choice of material can result in a number of different structures without changing the process parameters. Monolithic materials may have different temperature or UV-dependent viscoelastic properties, resulting in thinner or thicker "stems" of columnar structures, for example.

Similarly, the different constituents of polymer blends, block copolymers, or multilayer materials may shrink and swell upon heating, cooling, curing, etc., resulting in different structures than those solely imposed by the movement of the template/composition. One phase of a structure drawn from a polymer blend or block copolymer may be selectively dissolved, leaving a porous structure. Selectively dissolving one component of a multilayer material could result in hollow structures or change the aspect ratio or tip geometry after dissolving. The particles in composite materials could be forced to migrate through application of an electric field, for example, to a particular area in the drawn structure, giving it anisotropic material properties. The particles in composite materials can be selected upon specific dielectric properties to facilitate the electrostatic versions of the drawing process where the template and composite material are drawn together not by dipping the template in the composite material, but by maintaining separation and bridging the space between using electrostatic conditions.

Inducing the viscosity change from the first to the second viscosities can take many forms. Materials may be softened or melted through the application of heat either to the base (upon which the viscous material rests), the template, or the atmosphere. Different constituents may be heated independent of one another, inducing a temperature gradient to the system. The heating or cooling rates can be controlled by programmable heaters and the applications of external fans or quenching with a substance such as water or liquid nitrogen. The heating or cooling rates can be controlled by heating/cooling the supporting surfaces (of the patterned material) on either side via a cooling plate or thermoelectric cooling. The temperature influences the viscosity and thus the flow behavior of most materials.

Materials may be cured through the application of temperature, UV light, or the induction of a chemical reaction. As examples: when using a thermoplastic, it can be melted or softened by increasing the temperature, and then solidified by lowering the temperature. For a curable resin, it can be deformed at any temperature below its curing temperature and can be cured by raising the temperature and/or exposing to UV light. For polymer solutions, the solvent in the system can be evaporated by raising the temperature or reducing the pressure.

Template design can also take many forms. Templates can be many geometries or have multiple arrangements, each depending on the desired application. The size, shape, spacing, and overall arrangement of the template structures (protrusions) can be changed. Multiple sizes and/or geometries can exist on one template.

Templates can be formed from a material that retains the desired shape throughout the present process. Thus, the material make-up of the template should not degrade at the temperatures, pressures, chemistries, etc. contemplated by the present steps of the invention. Specifically, thermal properties of the template material are selectable and can be choose for a specific use, as the thermal properties of the template are an important factor in the overall process.

Template materials can be selected to limit or encourage the degree of contact (or wetting) between the template structures/protrusions and the viscous composition.

As well understood, regardless of the template material specification, most all properties of the template that are relevant in the present invention can be modified by, for example, changes to the template surface and/or additives applied to the template surface, to obtain desired interfacial properties.

Eventually, there is contact between portions of the template and viscous composition. This contact can take many forms. Contact between the template and viscous composition can be established by lowering the template and/or raising the viscous composition such that they physically come into contact—touch.

The template and viscous composition can be brought within a specified physical distance of one another, and the viscous composition electro-hydrodynamically "drawn" to surfaces of the template upon the application of a potential between, for example, the template and the viscous composition—where both the template and viscous composition can contain an adequate charge for electro-hydrodynamic coupling, or between the template and a base structure upon which the viscous composition rests or flows—where both the template and base structure can contain an adequate charge for electro-hydrodynamic coupling as the base structure (and thus the viscous composition atop the base structure) is attracted to the template.

The template and a composite composition can be brought within a specified distance of one another, and particles or fillers in the composite composition can be drawn toward the template (pulling the matrix material along with it) by applying an electric and/or magnetic field.

The degree of "contact" and resulting tip shape/size can be tuned in a number of ways. In the case of bringing the template and composition directly in contact (in physical contact), the degree to which the template protrusions/structures extend into the composition (colloquially, "dip depth") can cause more or less of the composition to adhere to the template. Allowing the template to dwell while in contact with the composition can allow the contact area to increase (wetting phenomenon—contact angle between the material and template changes as the composition spreads along the template surface until it reaches equilibrium). Both the "dwell time" and the temperature of the template and composition can of course affect the degree of wetting, and thus the amount of composition being "drawn" upward by the template.

If contact is established by means of an application of an electric and/or magnetic field for example, prolonged application of such a field can result in a larger contact area between the composition and template. For example, molten material is drawn toward a template after applying an electric field. Once contact is made, the electric field can be removed after a certain period of time, after which the "electrowetting" or spreading of the composition onto the template ceases.

Template translation can take many forms. After contact is established, the template and/or composition can be drawn away one from the another in a multitude of ways: linearly, laterally, and/or diagonal in fashion, if not combinations of two or more types. Further, the speed at which each component of the present invention moves can be independently controlled. In large measure, speed is dictated by the rheological properties of the material that is being drawn.

A viscosity increase is usually induced during this period (although it can also start before), but the viscosity needs to be low enough to allow for deformation. As discussed, this viscosity increase can be controlled in many ways—by changing temperature (to cool a melt or cure a resin), exposing to UV light, evaporating a solvent, or inducing some other chemical reaction to raise the viscosity of the composition. This viscosity change can happen slowly while the template and/or composition are in motion (e.g., a slow cooling), or it can happen very quickly if not instantaneously (e.g., quenching or flashing with UV light).

It can be helpful and improve adhesion of the composition to the template if contact is established at a lower viscosity than that at the onset of drawing. For example, the template can make contact with a molten material at a high temperature, then cooled slightly while dwelling in the material, then the two surfaces moved away from one another while the viscosity is still low enough to allow deformation. This allows time to tune the contact area (in the case of spherical template protrusions, the size of the suction cups) and the deformation profile of the "stem" (material will stretch and thin out differently at different temperatures).

The template and/or composition can be moved continuously or in a stepwise manner. A first example is where a template is raised vertically, shifted laterally, then raised again to make a curved or sinuous shape. In a second example, a template can be raised vertically, lowered, raised, etc. to create ridges or ripples in the structure or on the structure surface.

Leverage the change in viscosity and the movement of the template to target a particular structure is an objective of the present invention. Separating or moving the composition and template relative to one another when the composition is at a given viscosity (as determined by temperature, degree of cure, etc.) results in a particular deformation that is related to the composition's viscoelastic properties and the size/shape of the template protrusions, as well as the amount of composition being deformed (as determined by the wetting). Moving the surfaces in a stepwise manner and allowing time for cooling or curing (or other processes that affect the viscosity of the composition) between movements, and/or changing the speed of the template/composition, can result in different "neck" profiles along the height of the structure.

The present invention can further comprise a system for carrying out the inventive processes, the system comprising the template, an amount of viscous composition with first flow characteristics, and a relative motion mechanism configured to change the relative distance between a template and an upper surface of the viscous composition.

The template can be a plate with surface features. The template can be a roller with surface features.

The system can further comprise a base that holds the viscous composition. The base can be configured to be stationary. The base can be configured to move.

Other components of the present system can include one or more processors, memory, actuators, heaters, coolers, and the like, each designed to fashion the system to perform one or more of the inventive fabrication processes.

If drawing a thermoplastic at one temperature to a given height, then waiting at that height for the temperature to cool and raise the template further, the resultant curvature developed along the stem of a columnar structure would be different between these two regions, as the profile of the stem and the thinning or necking behavior depend on many properties, including the composition's temperature-, time-, and rate-dependent viscoelastic properties.

These and other objects, features and advantages of the present disclosure will become more apparent upon reading the following specification in conjunction with the accompanying description, claims and drawings.

BRIEF DESCRIPTION OF THE DRAWINGS

The accompanying Figures, which are incorporated in and constitute a part of this specification, illustrate several aspects described below.

FIG. 6A shows 0.75 and 1 mm pitch, 0.51 mm diameter solder balls on 75 mm Cu plates; FIG. 6B is a side and FIG. 6C a top microscope views of patterned Cu plates of FIG. 6A.

FIG. 7A is a micrograph of a heated pattern lowered towards molten polymer film;

FIG. 7B shows the pattern partially lowered into molten polymer film; and FIG. 7C showing the pattern drawn up to a specified height.

FIGS. 10A-10H illustrate a process to obtain epoxy pillars topped by spherical bumps, molded from a template obtained through a photoresist reflow and dry etch process, according to an exemplary embodiment of the present invention.

FIGS. 16A-16C are micrographs of other structures drawn according to an exemplary embodiment of the present invention.

DETAILED DESCRIPTION OF THE DISCLOSURE

Figures 1A, 1B, 1C:
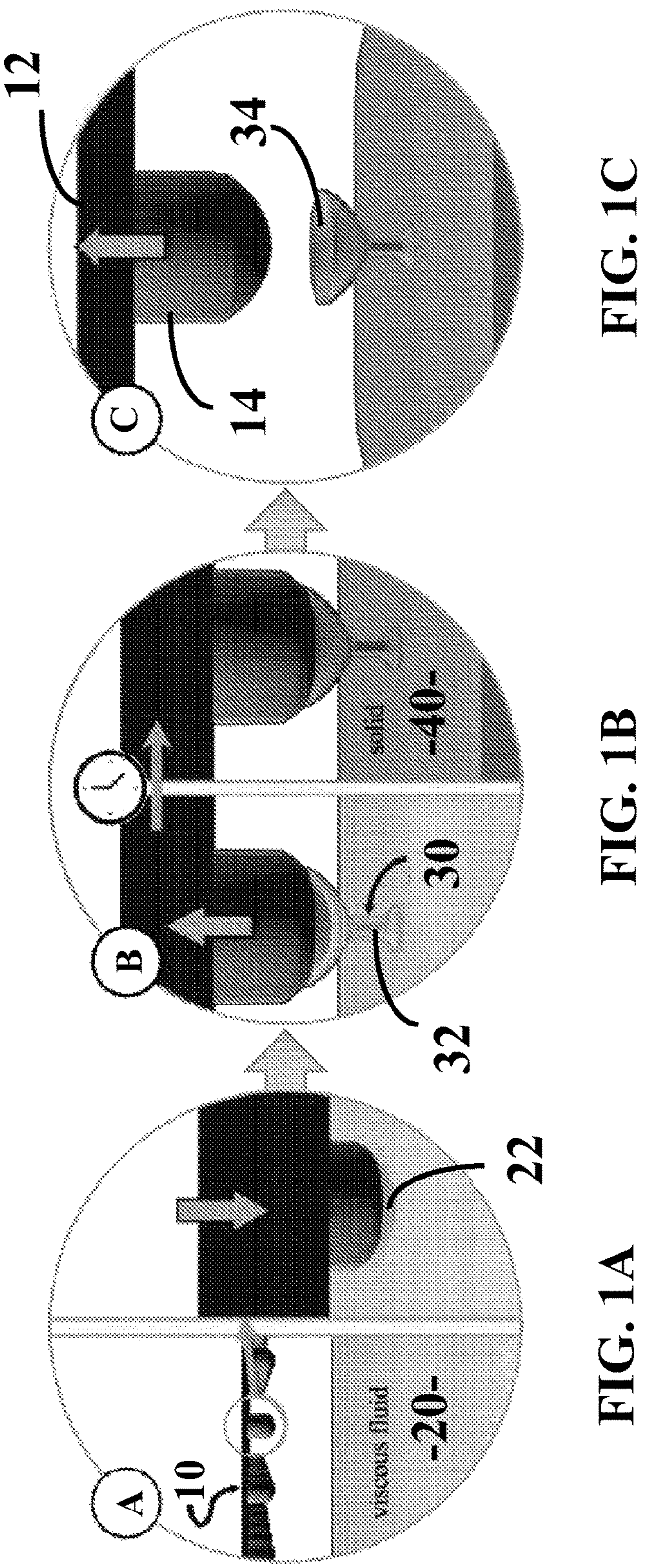
FIGS. 1A-1C are schematics illustrating key stages of the present drawcast process according to an exemplary embodiment of the present invention.

Although preferred exemplary embodiments of the disclosure are explained in detail, it is to be understood that other exemplary embodiments are contemplated. Accordingly, it is not intended that the disclosure is limited in its scope to the details of construction and arrangement of components set forth in the following description or illustrated in the drawings. The disclosure is capable of other exemplary embodiments and of being practiced or carried out in various ways. Also, in describing the preferred exemplary embodiments, specific terminology will be resorted to for the sake of clarity.

As used in the specification and the appended claims, the singular forms "a," "an" and "the" include plural referents unless the context clearly dictates otherwise.

Also, in describing the preferred exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another exemplary embodiment includes from the one particular value and/or to the other particular value.

Using "comprising" or "including" or like terms means that at least the named compound, element, particle, or method step is present in the composition or article or method, but does not exclude the presence of other compounds, materials, particles, method steps, even if the other such compounds, material, particles, method steps have the same function as what is named.

Mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

FIGS. 1A-C schematically illustrate an exemplary embodiment of the present invention. In the present drawcasting process, a method of structure formation from a viscous composition comprises changing the relative distance between a template 10 and an upper surface of a viscous composition having first flow characteristics (viscous composition 20), wherein one of the first flow characteristics is a first viscosity, from a distal position to a proximate position closer than the distal position, and forming free-standing structures 30 of the viscous composition having second flow characteristics (viscous composition 40), wherein one of the second flow characteristics is a second viscosity higher than the first viscosity, the structures 30 extending a height from a base portion to a tip portion 34.

The patterning material is capable of undergoing changes in flow characteristics. These changes can occur with or without (active) input. Cooling of the patterning material from a first temperature to a second temperature could change a flow characteristic at interest, and if the cooling were the result of leaving the patterning material to ambient conditions, then the change in flow characteristic is more a natural consequence rather than an active step/input (an outside step) of the process. If the cooling were a result of a purposeful and energy using heat exchanging step, then the change in flow characteristic as a result of temperature change is as result of additional process step, there from intentionality and purpose and performed by a designed subprocess.

Changes in flow characteristics could be the result of an additive to the patterning material between steps, or the evaporation of a chemical constituent between steps. Although in many embodiments of the present invention, the change in flow characteristics is a result of changes to the same patterning material throughout the process steps. Patterning material A is used throughout the process, its chemistry remaining the same, but other factors change to change its flow characteristics between steps. For example, changes in temperature, pressure, and the like.

Changes in flow characteristics do not necessarily include phase transitions (or phase changes), terms used to define the physical processes of transition between the basic states of matter: solid, liquid, and gas. For example, the patterning material can undergo a change in the flow characteristic of viscosity, without transitioning from a liquid to a solid, or vice versa. There are indeed embodiments of the present invention where changes in, for example, viscosity align with the physical processes of transition between the basic states of matter, but the inventive fabrication processes work with other types of forms of changes in flow characteristics, for example between a viscous liquid and a higher viscosity liquid. Or a liquid to a gel.

The present invention mainly depends upon the properties of the viscous composition 40. It is the viscous composition 40 (the composition having the second flow characteristics—the second viscosity) that must embody sufficient rheological properties to retain the desired structure. Indeed, a tested viscous composition had a glass transition temperature below room temperature (so it was not technically a solid). Nonetheless, the resulting structure 30 is self-supporting, and thus in most practical applications cannot have a viscosity at that point.

Forming the free-standing structures 30 can comprise drawing portions of the viscous composition 20 into physical contact with the surface of the template 10 at respective locations of contact 22 of the template 10.

Drawing portions of the viscous composition 20 into physical contact with the surface of the template 10 at respective locations of contact can comprise bringing the locations of contact of the template 10 and the upper surface of the viscous composition 20 into physical contact. This is shown in FIG. 1A.

Alternatively, drawing portions of the viscous composition 20 into physical contact with the surface of the template 10 at respective locations of contact can comprise keeping the template 10 distal the viscous composition 20 by a gap (not dipping portions of the template into physical contact with the viscous composition), and then providing a voltage difference between the upper surface of the viscous composition 20 and the template 10 sufficient to draw the portions of the viscous composition 20 through the gap and into physical contact of the surface of the template 10 at the respective locations of contact.

Those of skill in the art will understand that other ways can be used to bring the viscous composition 20 into contact with the template 10, depending on various physical parameters of the system, including the chemistry of the viscous composition, the temperature at which steps of the process occur, and/or the pressures, and/or the duration, and/or the other attributes of the viscous composition and the template to bring the viscous composition into contact the template.

Once the physical contact is made, there are numerous ways to form the free-standing structures 30. For example, increasing the relative distance between the template 10 and the upper surface of the viscous composition 20/40 (as the one or more flow characteristics of the composition change) can increase the height of the structure (FIG. 1B) until a distance is reached that physically removes the contact (FIG. 1C).

Forming the free-standing structures 30 can further comprise removing the physical contact of the portions of the viscous composition 20/40 and the template 10 (FIG. 1C), wherein upon removing the physical contact, the drawn portions of the viscous composition 40 (by this time, the one or more flow characteristics of the composition (termed herein as composition 20 to composition 40) change has form the free-standing structures, and wherein the tip portions 34 of at least a portion of the free-standing structures each have a shape based at least in part by the respective shape of the location of contact (shape of the projections 14 of the template 10) of the respective drawn portions of the viscous composition in prior physical contact with the contact surface.

In the present drawcasting process, FIG. 1A illustrates the patterned template 10 comprising a base surface 12 with projections 14 therefrom, being lowered to a specified depth into the patterning material 20 (for example, a viscous composition at a first viscosity), which forms a meniscus 22 on the patterned surface 14. The patterning material 20 can also be a viscous precursor. As one of skill in the art understands, it is the relative movement between the template 10 and patterning material 20/40 that is operative. That is, it can be the patterning material being moved toward the template 10, and/or that both the template 10 and the patterning material are brought toward one another.

The distance between the template 10 and patterning material is then increased to a specific distance (for example only, the template 10 is "lifted" to a specified position), that draws a templated pattern 30 (a structure 30) from the patterning material (FIG. 1B). The templated pattern 30 comprises a capillary bridge portion 32 dynamically supported by both surface tension and the viscous forces opposing gravity.

Following the changes in one or more flow characteristics (moving from patterning material 20 to patterning material 40), the more rigid form of the templated pattern 40 releases from the patterned surface 14 of the patterned template 10 (FIG. 1C). As one of skill in the art understands, in some embodiments, the flow characteristic at issue is viscosity, and in that situation, the first viscosity is higher than the second viscosity. In an exemplary embodiment, the patterning material 20 is a liquid state, and the patterning material 40 is a solid state of the patterning material. For example, the newly solid structures 30 are released from the template 10 yielding a drawcast pattern portion 34. Release can be achieved through the change in flow characteristics (various properties) of the patterning material, for example, solidification and/or through a prior application of a release agent to the patterned surface 14 of the patterned template 10. Other releasing mechanisms can include various chemical, material, electrical, and other changes in properties or applications to the template and/or the patterning material to enable, enhance, or slow the release mechanism.

In exemplary embodiments, the changes in flow characteristics of the patterning material does include a phase transition/phase change, where the patterning material has a liquid to solid transformation and its liquid phase wets or temporarily adheres to the patterned surface 14 of the patterned template 10. Examples of transformations of the present process that may or may not result in phase changes include, among others, reversibly by cooling through a freezing point or glass transition, irreversibly by cross-linking a polymer, and evaporation of a solvent or gelation.

The scale of the patterned structure is largely dictated by patterned surface 14 size and shape as well as the rheological and contact angle behavior of the (liquid phase) patterning material. As one of skill in the art understands, properties can be further tailored through chemistry, by sol-gel routes, for example, or composites, by incorporating particulates into a structural or fugitive matrix.

Figure 2:
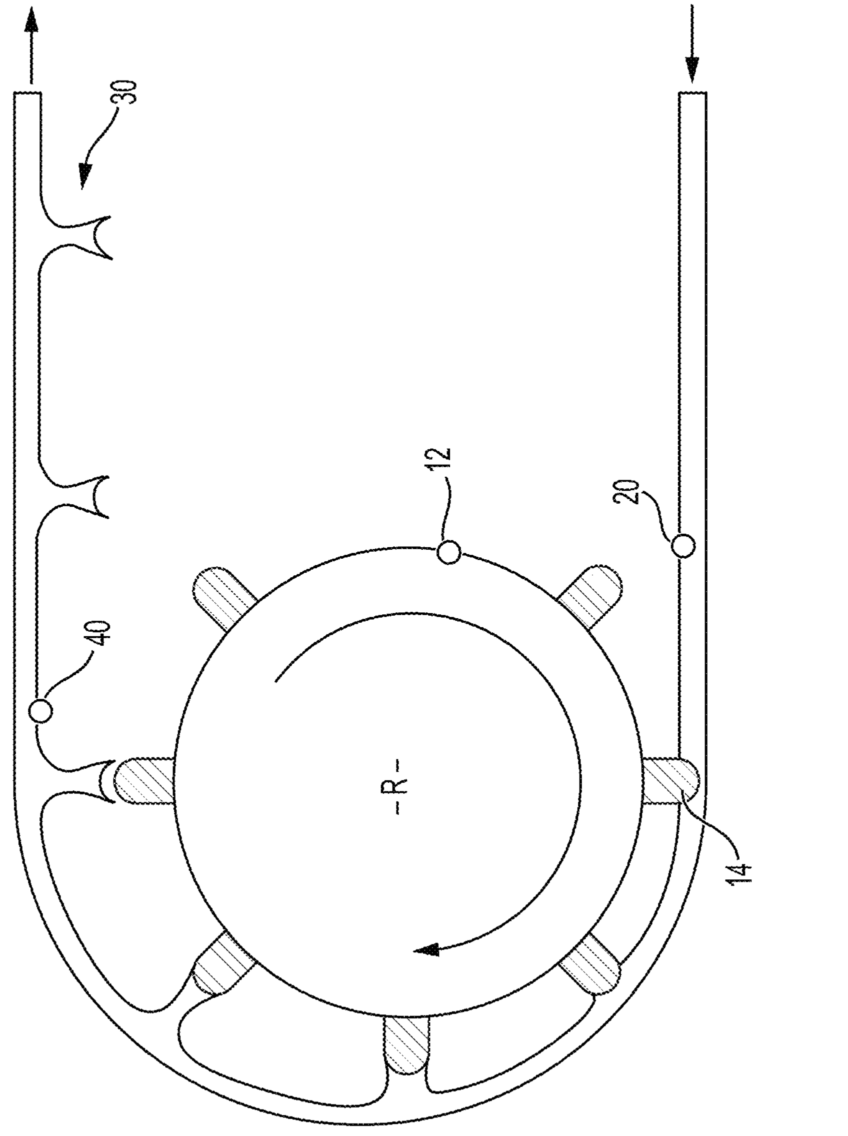
FIG. 2 is a schematic example of a continuous drawcasting process according to an exemplary embodiment of the present invention.
Figure 3:
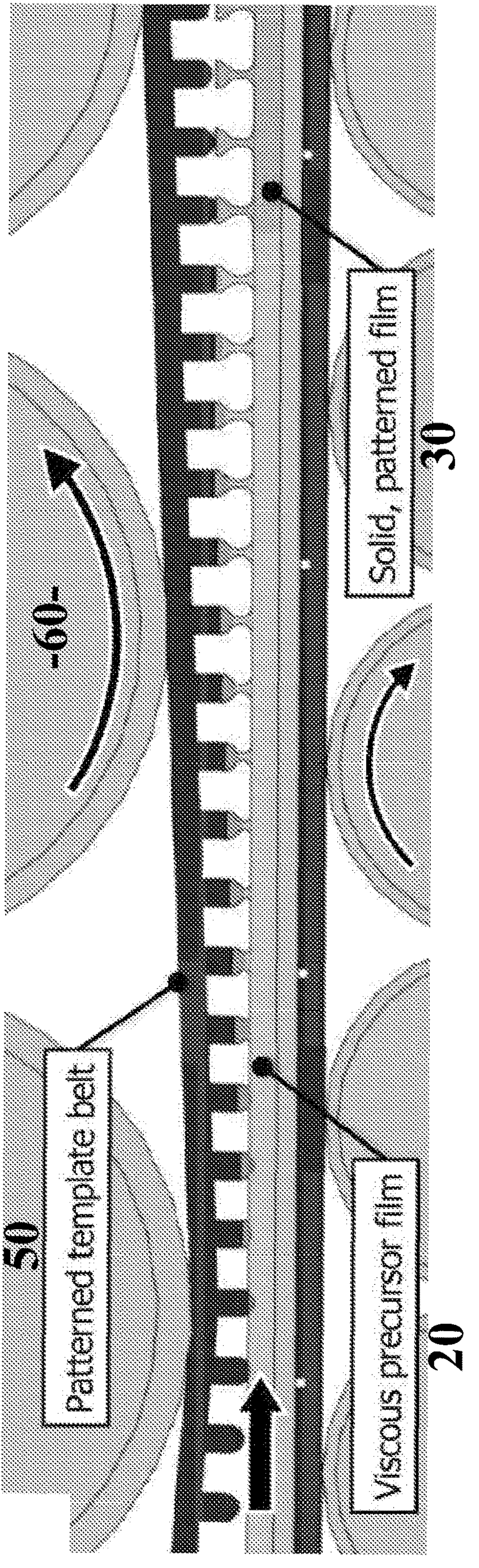
FIG. 3 is a schematic example of another continuous drawcasting process according to an exemplary embodiment of the present invention.

In the course of the present process, one or more variables can be included and/or adjusted continuously, discretely and at any one or more steps, including for example only, pattern temperature, viscous film temperature, rate of displacement during drawing, extent of displacement during drawing, direction of displacement with respect to the original pattern/film contact location, using more than one lowering/displacement cycle during the drawing process, film composition (single or multi-layer), patterned area size, structural element shapes (for example including convex or concave portions), and the potential for continuous manufacturing in "reel-to-reel" processes (FIGS. 2-3)

For example only, the relative movement can include various components of movements—as to vector of movement(s), duration(s) of movement (and non-movement), rate of movement(s), and other physical and chemical conditions at each movement (for example only, temperature and/or pressure and/or chemistry changes (additions of substances) that are controlled during particular states of movements/non-movements).

For example only, the movement can include only a vertical component (be up and down) in a single, continuous movement at a constant rate over a single time period. The movement can include a vertical and horizontal component, (both up and down while simultaneously (or discretely) sideways in one direction and/or from side to side).

For example only, the movement can include only a vertical component, and over a movement over a single time period, while the rate of the movement changes over time (discretely or continuously or elements of both). The movement can include only a vertical component, but over two discrete time periods (non-movement between the two or more time periods of movement, and each window of movement can proceed in the same or different fashion one from the other (one at a constant rate and another at a non-constant rate). And each of these scenarios can include horizontal components of movement, (a movement can be diagonal having both components of vertical/horizontal, and/or a first movement can be up/down for a time, and sideways for a time, and/or one movement can be diagonal, another vertical, another horizontal, and combinations of one or more) and the resultant vector of movement can be continuous or discrete. As one of skill in the art understands, the combinations of movement, number of movements, speed of movements, directions of movement, time of movements, etc. can be individually tailored to accomplish the desired result.

In an exemplary embodiment of the present fabrication process, FIGS. 2-3 illustrate a continuous drawcasting processes. FIG. 2 illustrates the patterning material in the first phase 20 approaching the patterned template 10 comprising a patterned roller R comprising the base surface 12 with projections 14. The patterned roller R makes contact with the patterning material (being a continuous viscous film), draws the film up where contact is made, and separates from the film as it changes phases (solidifies) into the second phase 30 of the patterning material.

FIG. 3 illustrates a patterned template belt 50 lowering into the patterning material in the first phase 20 (being a continuous viscous film), draws the film up where contact is made, and then separated from the film as it solidifies into the second phase 30 of the patterning material. Horizontal movement of both the patterned template belt 50 and a surface upon which the patterning material is held, and vertical movement of the patterned template belt 50 can be accomplished by rollers 60. Among other ways, the relative movement of the patterned template belt 50 and the patterning material can be handled via size and/or vertical alignment of separate one or more rollers 60. Further, the surface upon which the patterning material is held need not be moved laterally, as contact of the patterning material with the patterned template belt 50 can impart lateral movement of the film.

Figure 4:
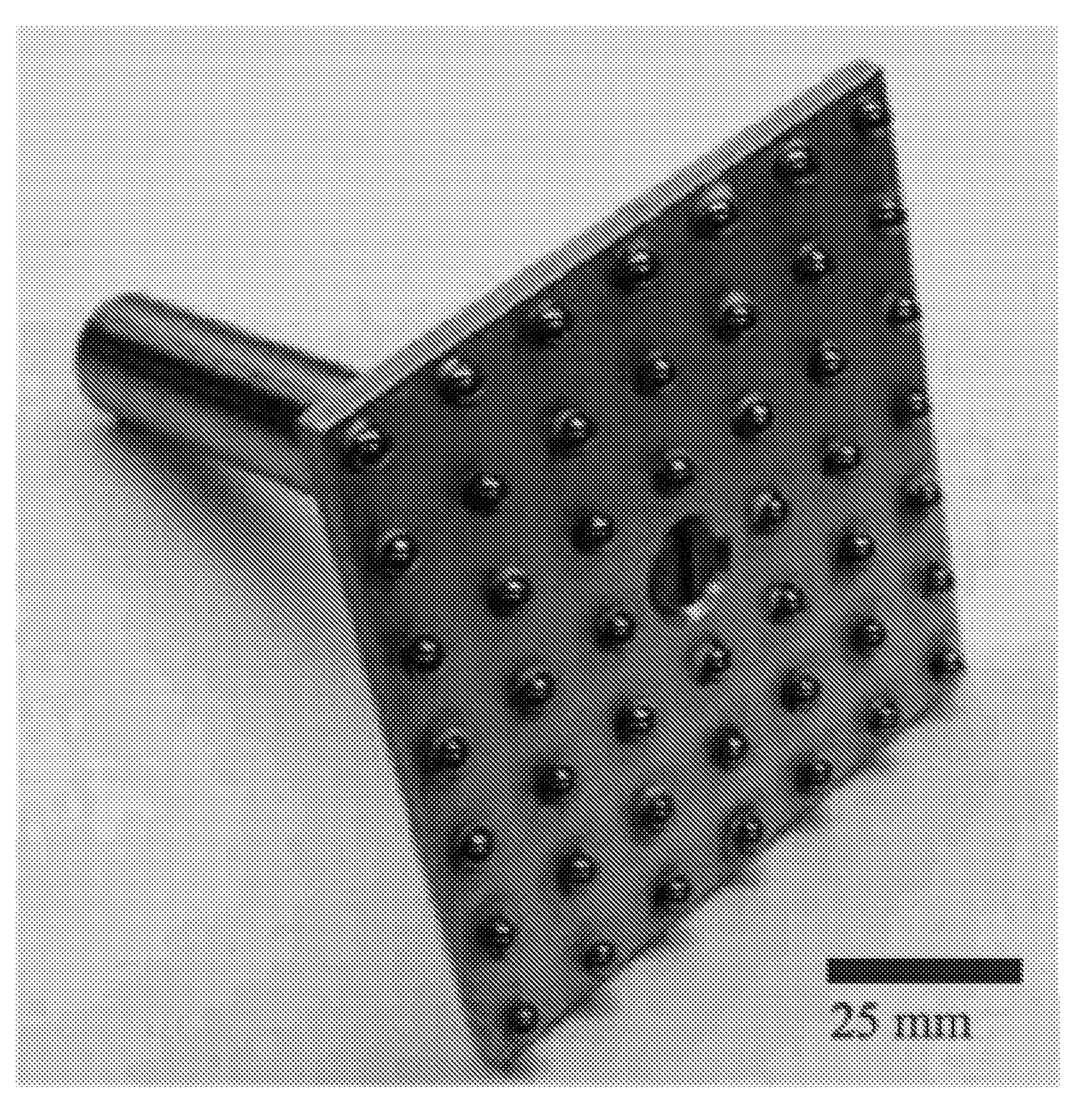
FIG. 4 is a photograph of a draw casting template comprising ball bearings adhered to a perforated aluminum plate according to an exemplary embodiment of the present invention.
Figure 5:
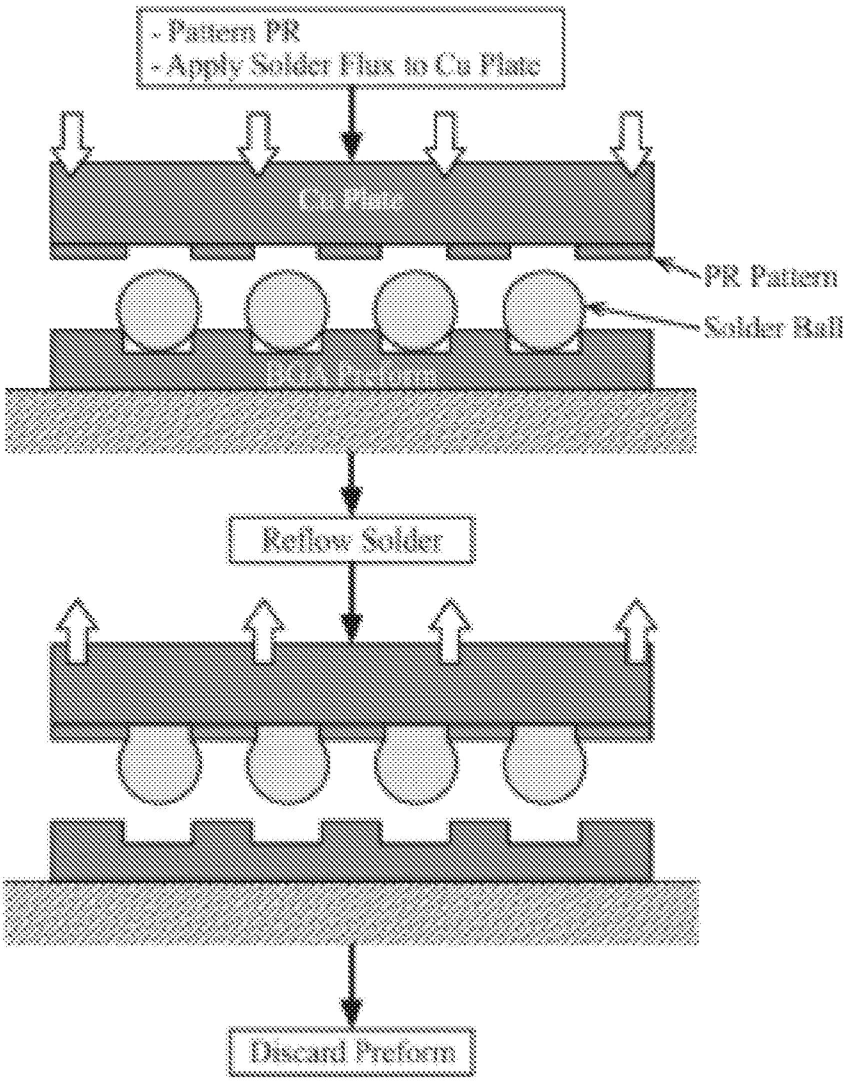
FIG. 5 is a schematic depicting a ball grid array (BGA) pattern fabrication process according to an exemplary embodiment of the present invention.
Figure 6A:
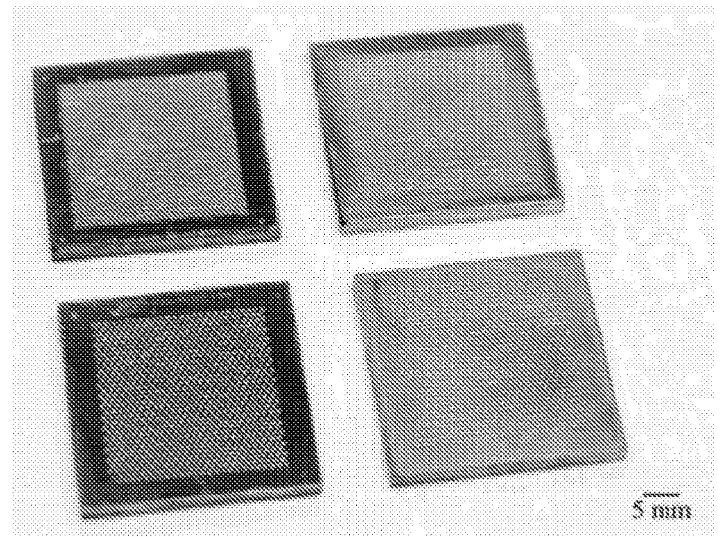
FIGS. 6A-6C illustrate a patterned Cu templated via a BGA preform method.
Figure 6B:
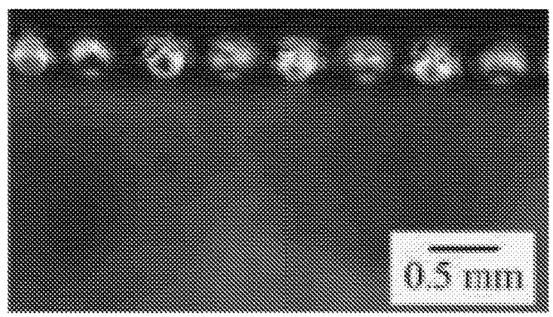
Figure 6C:
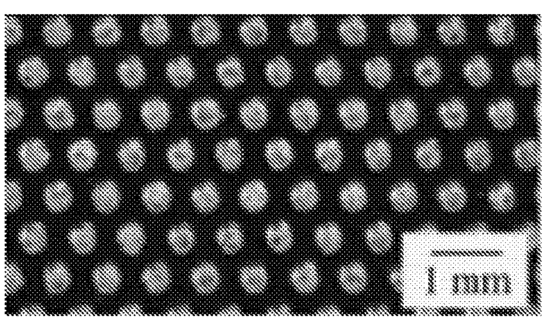

The present invention further comprises several pattern methods. Pattern scale dictates fabrication strategies. At the millimeter length scale, computer numerical control (CNC) and other metalworking methods can be employed to produce arrays of pattern elements, such as precision-ground metal spheres adhered to a perforated plate as shown in FIG. 4.

For patterns with structures on the order of 100s of microns, ball grid array (BGA) preforms comprising monodisperse solder beads arranged with a perforated, adhesive-backed polyethylene terephthalate (PET) template are transferred to a solder-masked copper plate using a solder reflow process (FIGS. 5, 6A-C).

Figure 7A:
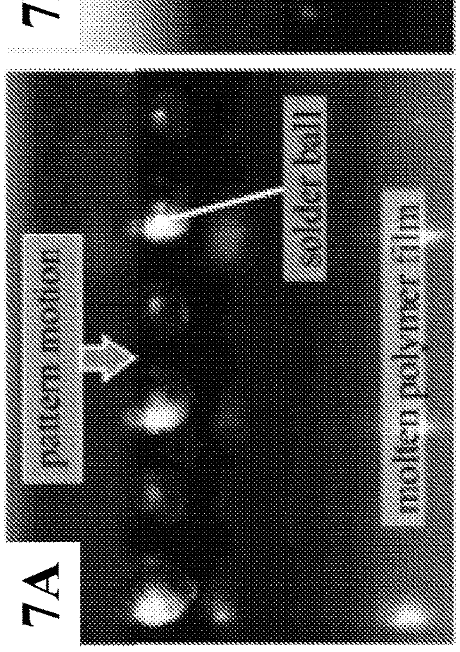
FIGS. 7A-7C illustrate drawcasting process steps using the BGA patterned Cu substrate of FIGS. 6A-6C.
Figure 7B:
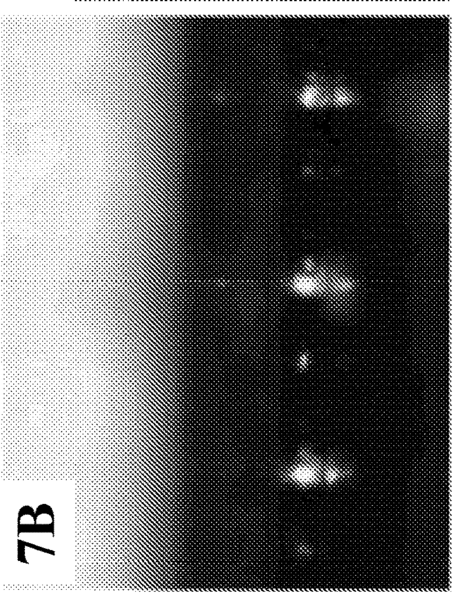
Figure 7B:
Figure 7C:
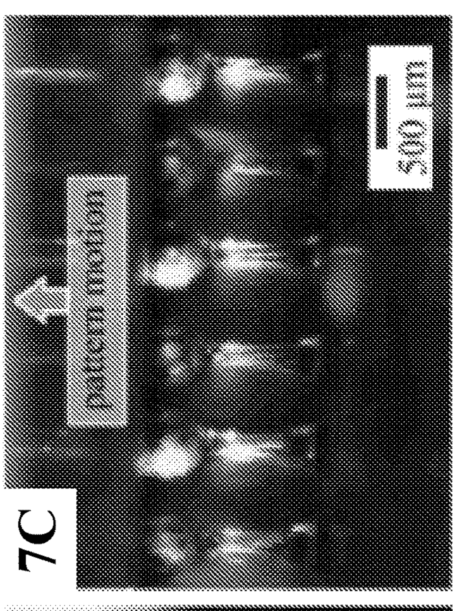
Figure 7C:
Figure 7C:

FIGS. 7A-C illustrate drawcasting process steps using the BGA patterned Cu substrate shown in FIGS. 5, 6A-C.

To obtain patterns with features from 50 to 250 microns, processes/steps based on microlens array fabrication were developed and are shown in FIGS. 8A-G. Patterned photoresist pillars are reflowed to produce uniform, spherical bumps on a silicon substrate. PDMS (polydimethylsiloxane, Sylgard 184) is cast onto the substrate, cured and removed to produce a mold. Epoxy is cast onto the mold, followed by a rigid substrate. The resulting pattern comprises epoxy bumps on the rigid substrate.

Figures 8A, 8B, 8C, 8D, 8E, 8F, 8G:
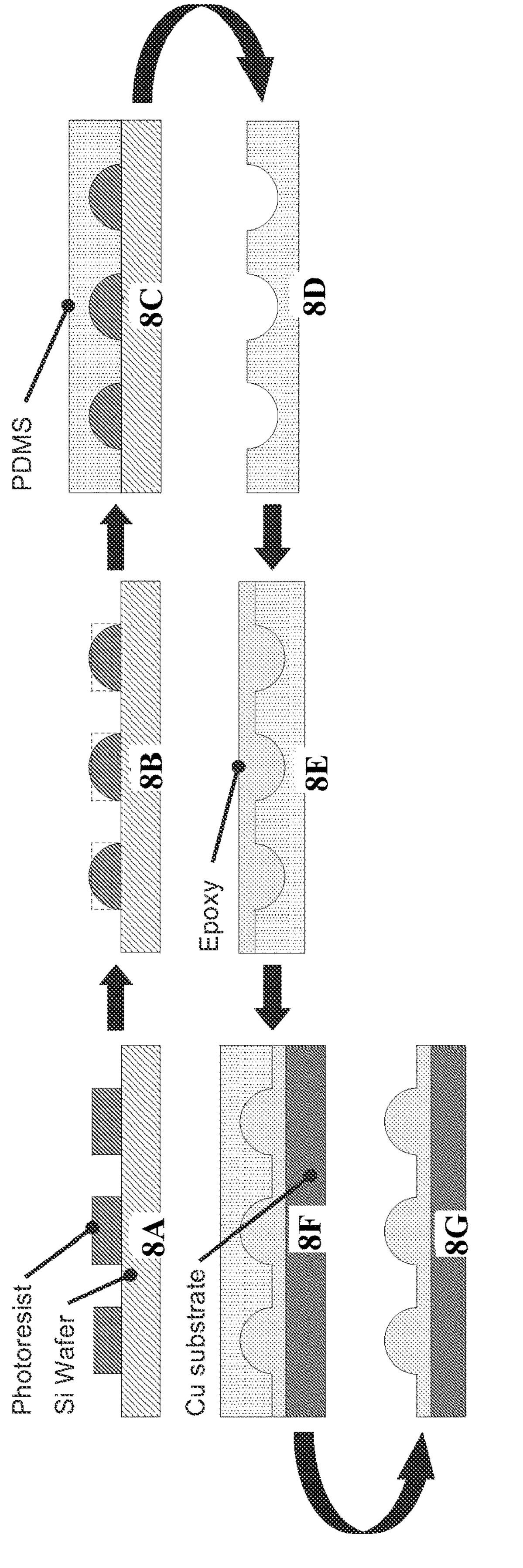
FIGS. 8A-8G illustrate spherical epoxy bumps, molded from a template obtained through a photoresist reflow process according to an exemplary embodiment of the present invention.

FIGS. 8A-G illustrate spherical epoxy bumps, molded from a template obtained through a photoresist reflow process. The steps include FIG. 8A lithographically patterned photoresist pillars; FIG. 8B the photoresist assumes a spherical shape following a thermal reflow process; FIG. 8C PDMS (Sylgard™ 184) is cast onto the reflowed bumps and removed; FIG. 8D after thermal curing; FIG. 8E epoxy is cast onto the PDMS mold and adhered to a rigid copper substrate; and FIGS. 8F, 8G the resulting template is an epoxy pattern on the copper substrate.

Figure 9A:
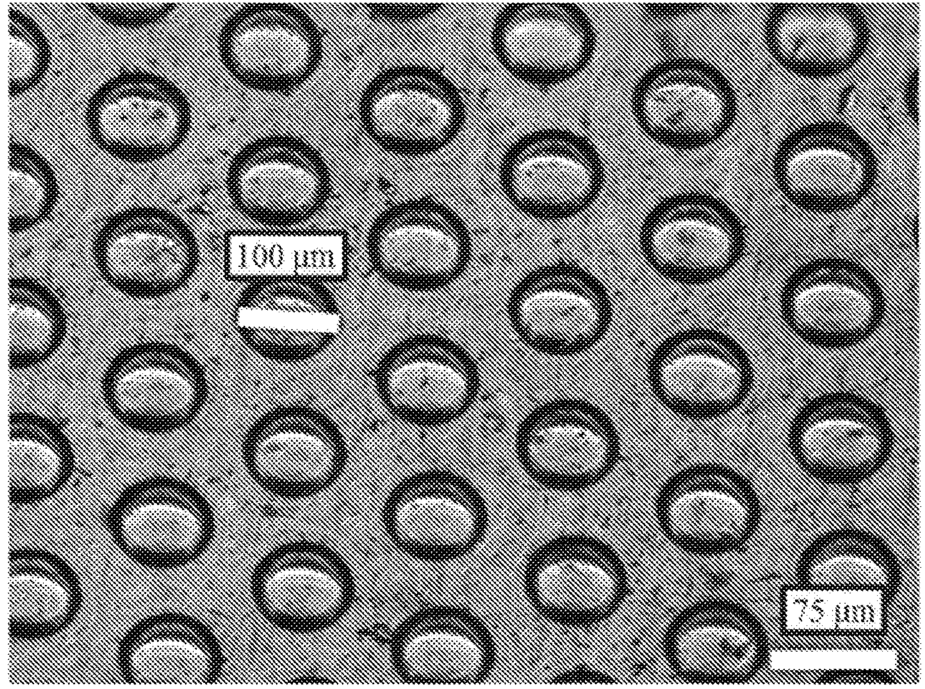
FIGS. 9A-9B illustrate drawcasting from epoxy bump patterns according to an exemplary embodiment of the present invention.
Figure 9B:
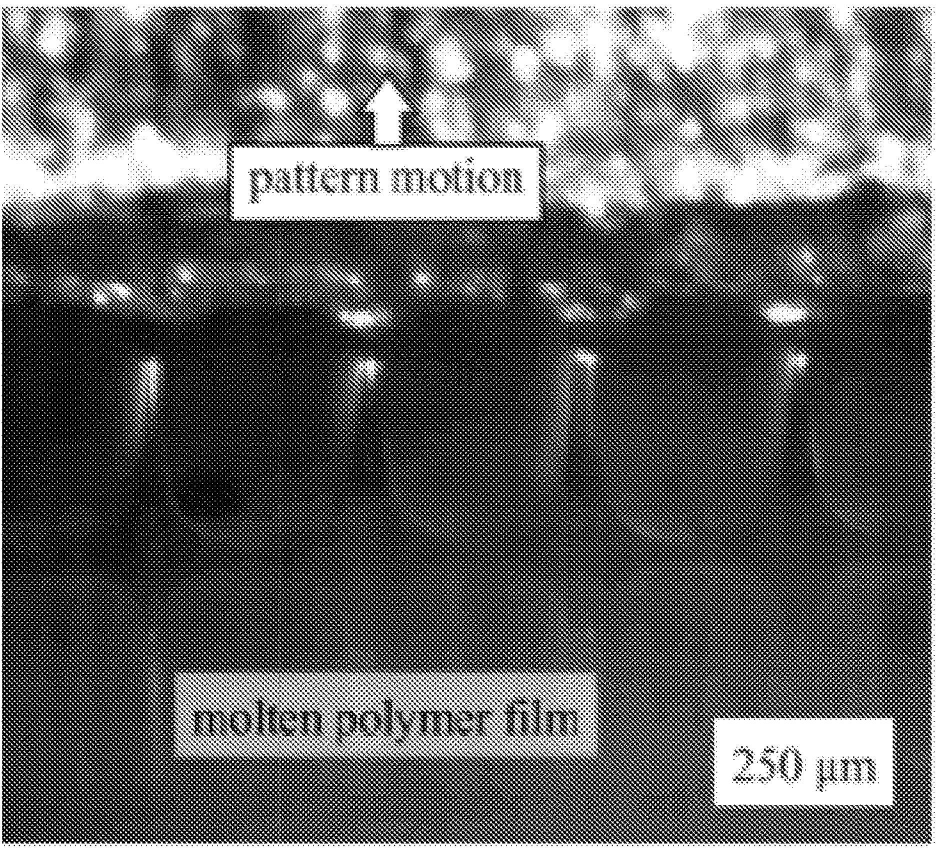

FIGS. 9A-B illustrate drawcasting from epoxy bump patterns. FIG. 9A shows a pattern comprising epoxy bumps on a copper substrate, fabricated by a photoresist reflow—pattern transfer process. FIG. 9B illustrates is a drawcasting process image using patterned epoxy bumps shown in FIG. 9A. The processes of FIGS. 8-9 can be modified to produce an array of pillars with rounded tops to address precursor adhesion in cases where drawing steps may result in over-dipping (FIGS. 10A-H). In this process, the reflowed photoresist is used both as template and an etch mask that produces pillars following a dry etching step.

FIGS. 10A-H illustrate an exemplary process to obtain epoxy pillars topped by spherical bumps, molded from a template obtained through a photoresist reflow and dry etch process. The steps include FIG. 10A photoresist spun onto a Si wafer is lithographically patterned to obtain FIG. 10B photoresist pillars; FIG. 10C the photoresist assumes a spherical shape following a thermal reflow process; FIG. 10D the reflowed photoresist serves as a dry etch mask to produce Si pillars; FIG. 10E PDMS (Sylgard 184) is cast onto the reflowed photoresist/etched Si pillars and removed FIG. 10F after thermal curing; FIG. 10G epoxy is cast onto the PDMS mold and adhered to a rigid copper substrate; and FIG. 10H the resulting template is an epoxy pattern on the copper substrate.

Figures 11A, 11B, 11C, 11D:
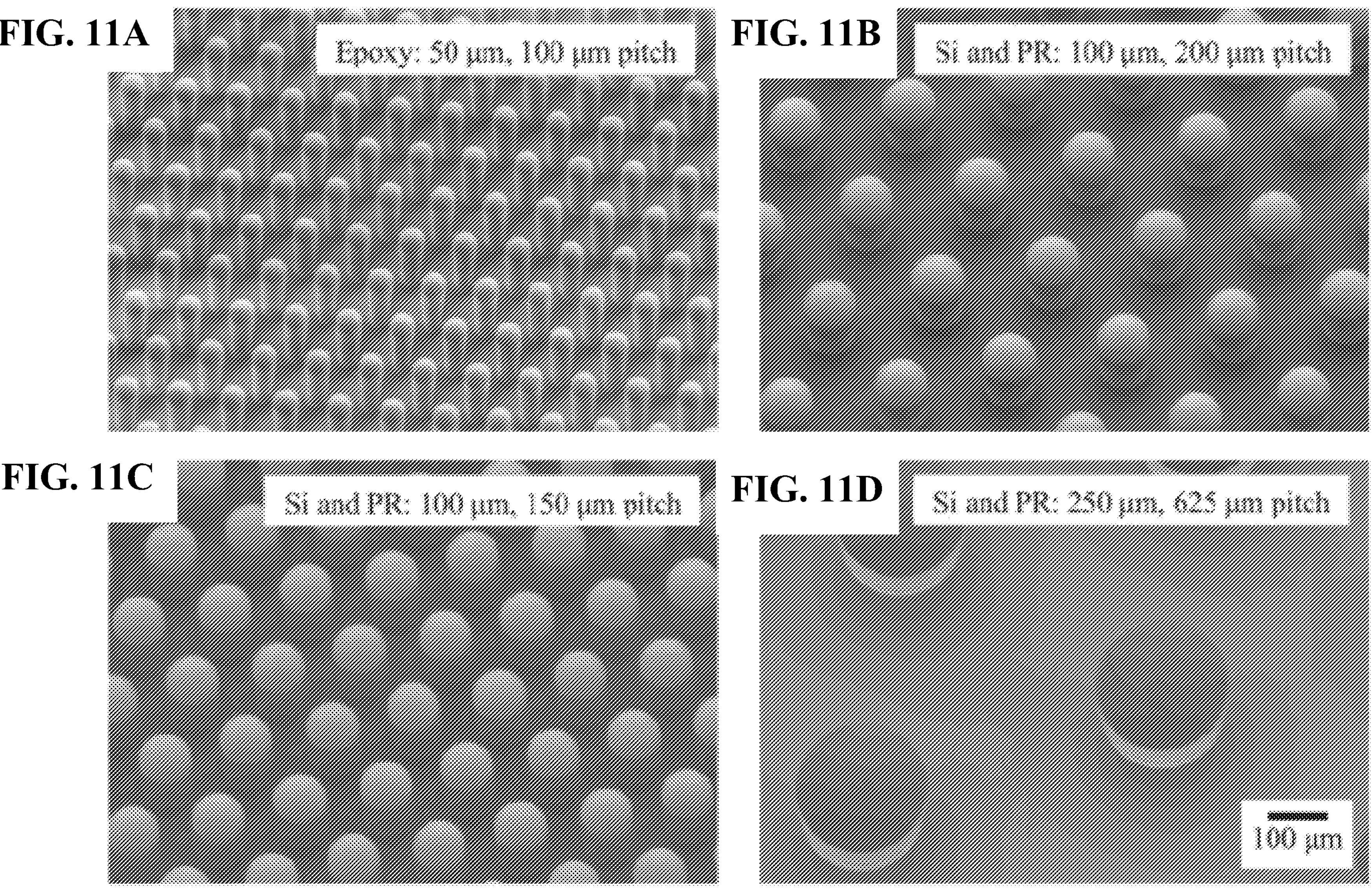
FIGS. 11A-11D are micrographs of patterned templates from photoresist reflow and a dry etch process, according to an exemplary embodiment of the present invention.

FIGS. 11A-D are micrographs illustrating patterned templates from photoresist reflow and dry etch process. FIG. 11A shows epoxy pillars cast from PDMS master mold. FIGS. 11B-11D show etched Si master wafers consisting of pillar arrays topped by reflowed photoresist.

Another process that reliably produces beneficial templates is electroforming. Electroformed parts are made by very thick plating unto a mandrel, followed by mandrel removal, either by separation or dissolving it. FIGS. 12-13 illustrate this process.

Figures 12A, 12B, 12C:
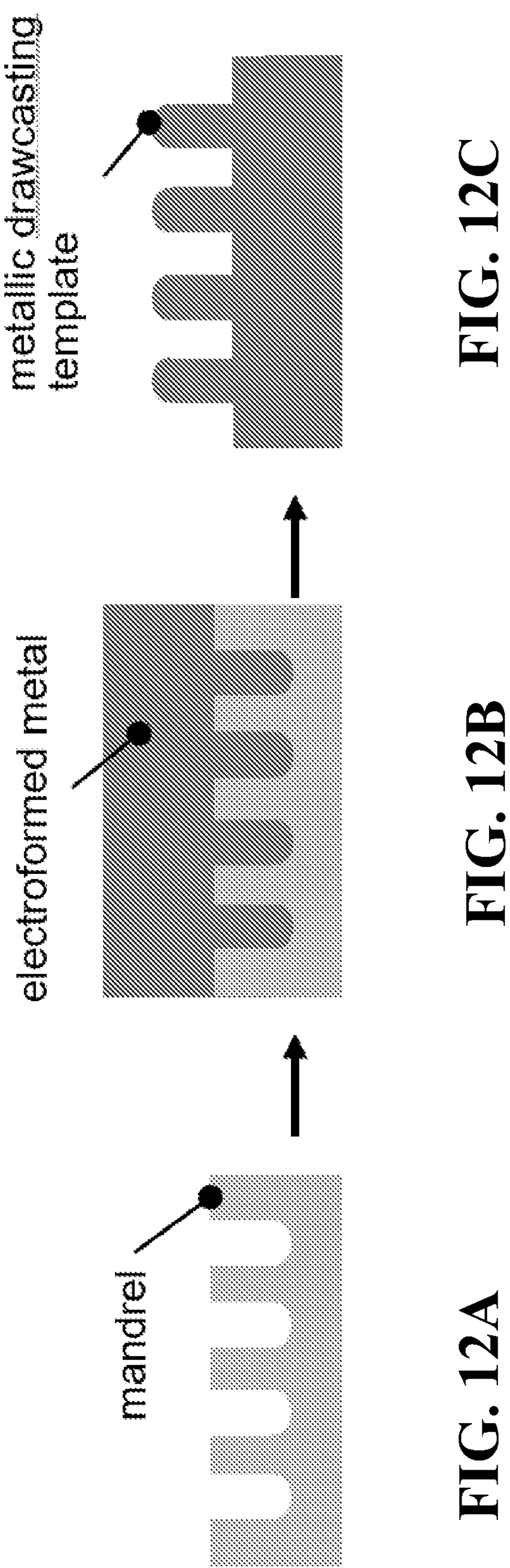
FIGS. 12A-12C schematically depict the electroforming of a drawcasting template according to an exemplary embodiment of the present invention.

FIGS. 12A-C schematically depict the electroforming of a drawcasting template. FIG. 12A shows a metal mandrel machined to have a negative of the desired pattern structure of the template. The mandrel can be made of many materials as long as the surface is electrically conductive. FIG. 12B shows the metal being electroplated onto the mandrel to thickness sufficient for use as a drawcasting template FIG. 12C shows the resulting patterned template after removal from the mandrel.

Figures 13A, 13B:
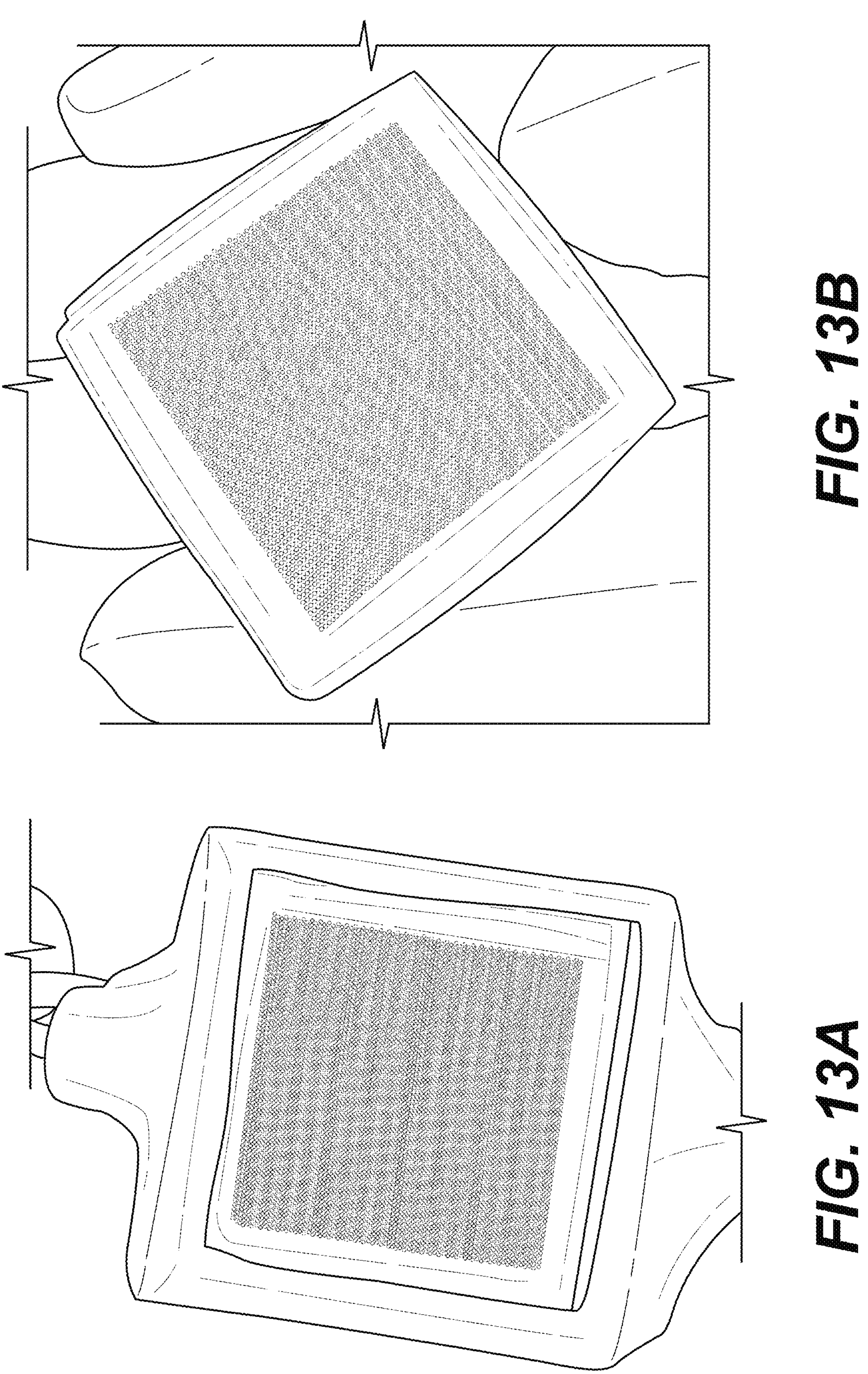
FIGS. 13A-13C are photographs of electroforming a drawcasting template according to an exemplary embodiment of the present invention.
Figure 13C:
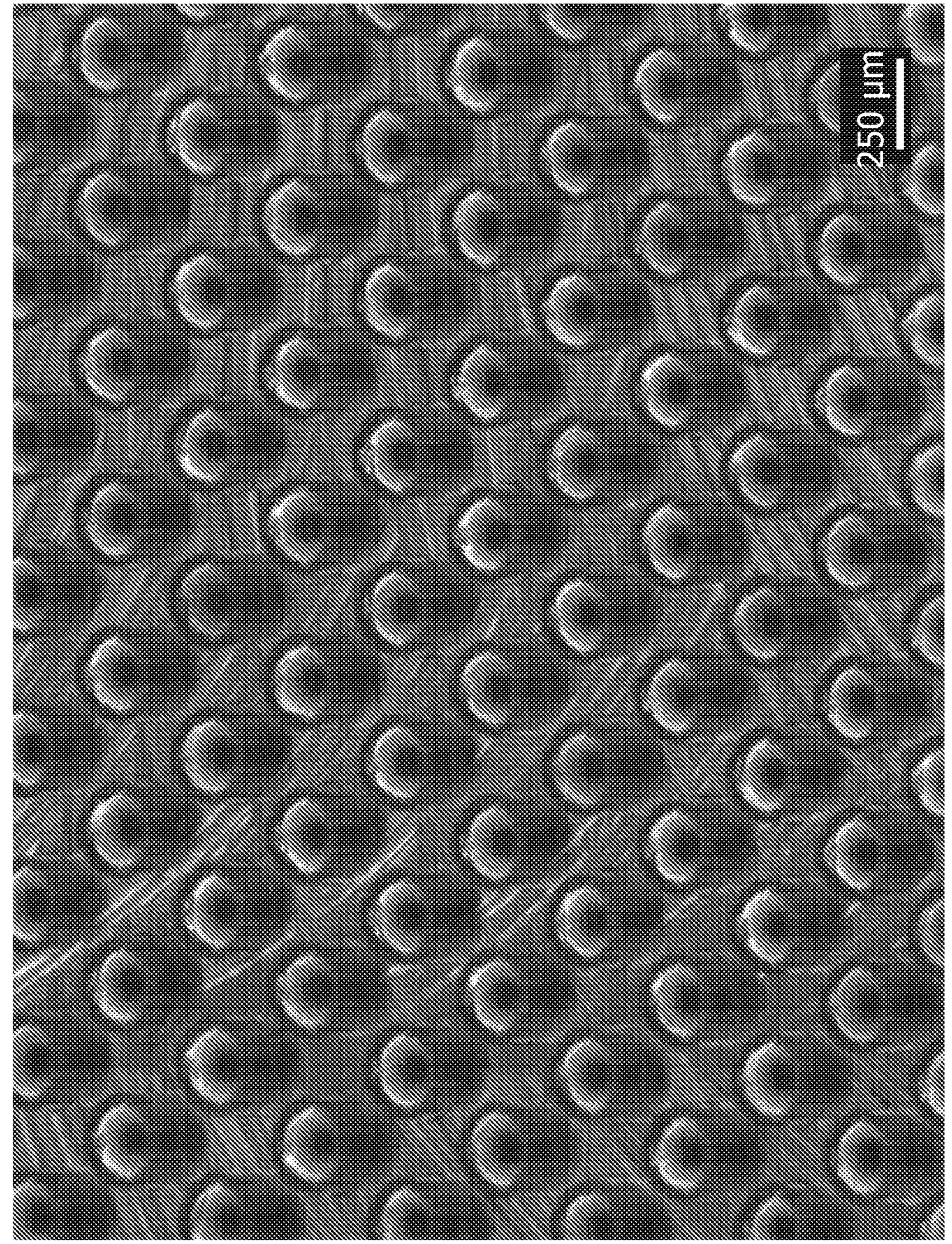
Figure 14C:
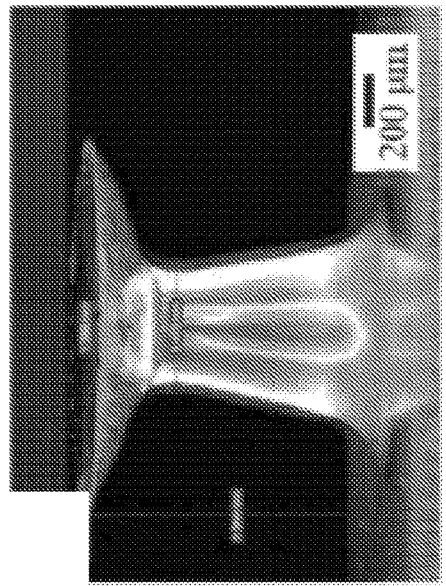
FIGS. 14A-14C are micrographs of structures drawn according to an exemplary embodiment of the present invention.
Figure 14B:
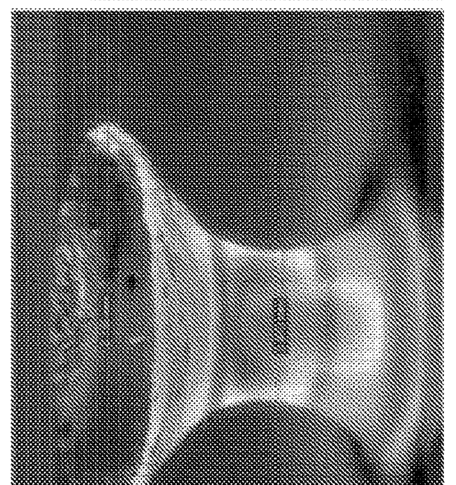
Figure 14A:
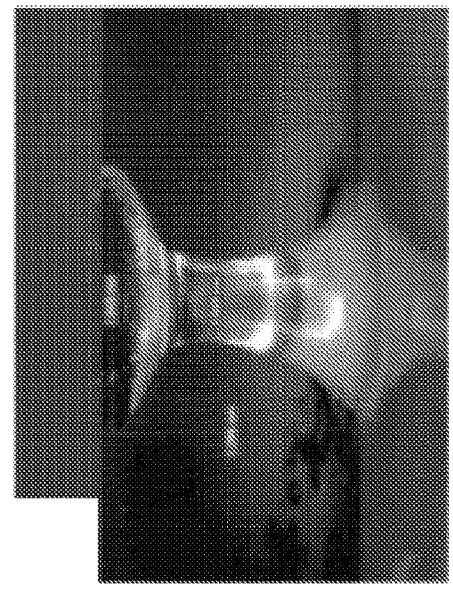

FIGS. 13A-B are photographs at steps of FIGS. 12A-C. FIG. 13A is the metal mandrel machined to have a negative of the desired pattern structure of the template. FIG. 13B is the resulting patterned template after removal from the mandrel. The mandrel can be mechanically separated or chemically etched away. FIG. 13C is a micrograph depicting the structure on the patterned surface.

FIGS. 14-17 show examples of structures generated from exemplary embodiments of the present processes. FIGS. 14A-C show structures drawn from 3 mm stainless steel ball bearings. Base materials are FIG. 14A Dow INFUSE™ 9108; FIG. 14B Dow INFUSE™ 9508; and FIG. 14C low density polyethylene (LDPE). The structures are 1.296 mm, 1.524 mm and 1.264 mm in height, 0.455 mm, 0.815 mm and 0.470 mm in various locations of necking thickness, and have a top feature of diameter of 1.449 mm, 2.150 mm and 1.568 mm. The first of each measurement applies to the structure of FIG. 14A, the second to the structure of FIG. 14B, and the third to the structure of FIG. 14C.

Figure 15C:
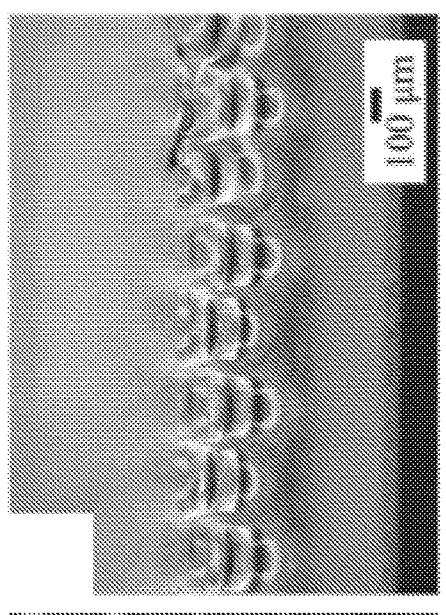
FIGS. 15A-15C are micrographs of other structures drawn according to an exemplary embodiment of the present invention.
Figure 15B:
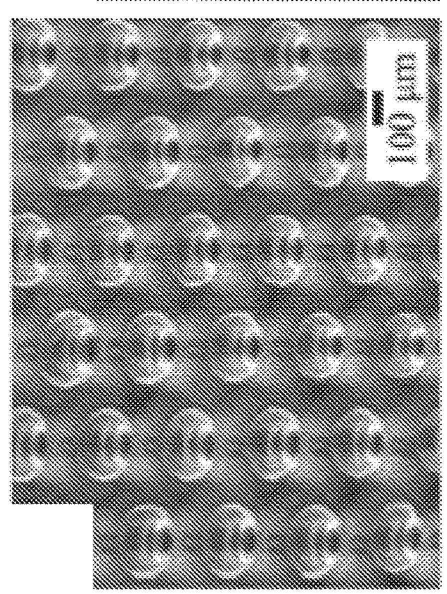
Figure 15A:
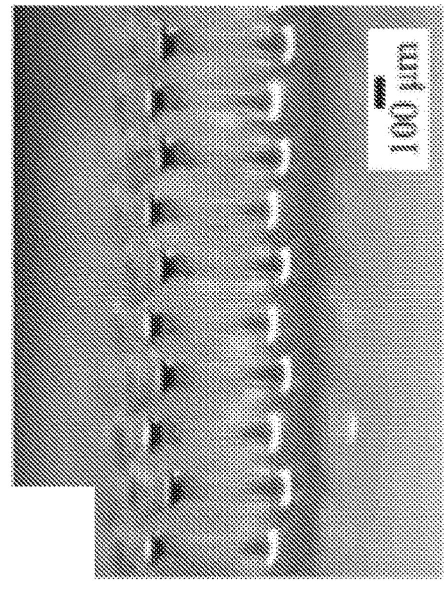
Figure 17C:
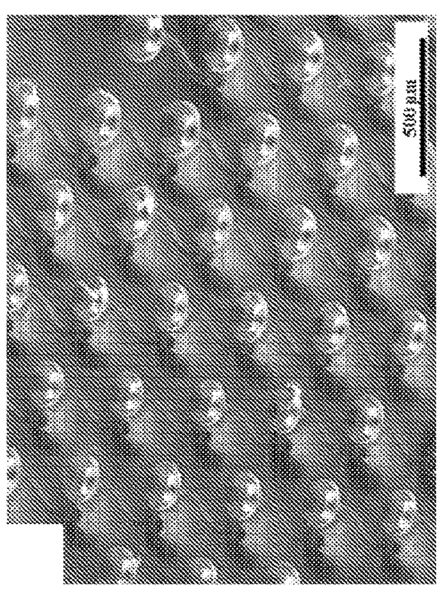
FIGS. 17A-17C are micrographs of other structures drawn according to an exemplary embodiment of the present invention.
Figure 17B:
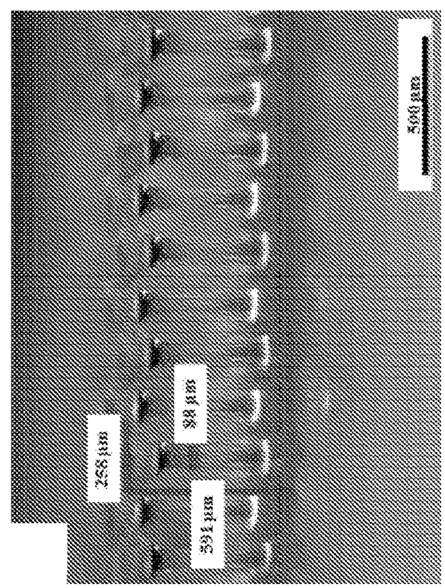
Figure 17A:
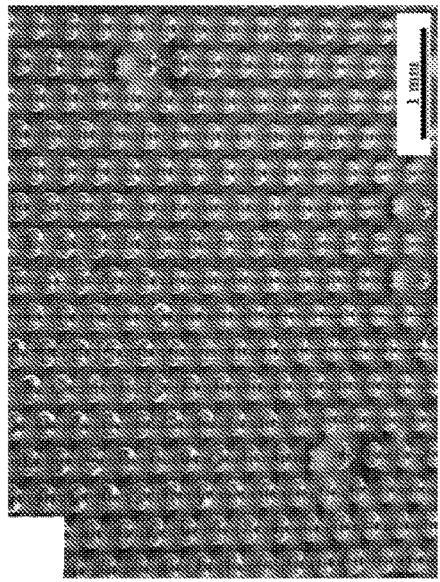

FIGS. 15A-C show structures drawn from 250 μm diameter epoxy pillars in low-density polyethylene (LDPE). FIGS. 15A-C illustrate different pitch sizes and draw heights. FIGS. 16A-C show structures drawn from epoxy pillars in Dow INFUSE™ 9508. FIG. 16A shows 500 μm pillars, 250 μm pitch; FIG. 16B shows 250 μm pillars, 400 μm pitch and FIG. 16C shows 100 μm pillars, 170 μm pitch. FIGS. 17A-C are additional examples of draw-cast structures from thermoplastic resin. FIG. 17A is a top view and FIG. 17B a side views of an orthogonally drawn spherical array pattern in thermoplastic. FIG. 17C illustrates results of spherical array pattern drawn up from a thermoplastic with a small offset/horizontal translation.

The present invention has numerous applications. For example, the patterned surfaces can be used for reversible attachment or (wet and/or dry) adhesion. The present drawcast structures have initially been fabricated in several polymer systems to achieve adhesion through arrays of micro-scale suction cups. Cup spacing, width, radius of curvature and height can be controlled by template design and process parameters.

The patterned surfaces can be used for diffractive surfaces. Patterned surfaces on dielectric materials can efficiently control scattering over large areas. Finer pitch/element sizes may be used for operation at IR and visible wavelengths. Other critical applications in the IR and visible bands include, among others, frequency selective windows to reduce glare; anti-reflection for large-scale solar cells to improve efficiency; surface waveguides (i.e. photonic bandgap waveguides) and whispering gallery mode resonator arrays for integrated photonics; and controlled emissivity for directed heat dissipation.

The patterned surfaces can be used for optical microresonator arrays. In terms of metamaterial topology, the patterned structures formed via drawcasting could potentially support whispering-gallery modes (WGMs). Coupled monodispersive WGM resonators can give rise to potentially useful spectral signatures. The drawcast process could enable large-scale, low-cost production of diffractive metamaterials with subwave length spatial features.

Further development may incorporate numerous aspects that are currently being neglected, including specific angular sectors and frequencies of interests (e.g., LWIR, mm-wave, visible), the interplay between bandwidth and angular span, dispersive material models to accurately predict the fabricated structure, effects of introducing nano-plasmonic particles into the binder, and more complicated metamaterial topologies. Concerning metamaterial topology, the feature of the capillary bridge could potentially support whispering-gallery modes (WGMs). It has recently been demonstrated that coupled monodispersive WGM resonators can give rise to interesting spectral signatures. The marriage of these two seemingly disparate technology areas could lead to large-scale production of diffractive metamaterials with subwave length spatial features.

Whispering-gallery mode microgoblet lasers can be integrated into a microfluidic chip using a hybrid lithography process. Coupled monodispersive whispering-gallery mode resonators with hybridized modes can be fabricated.

It is to be understood that the exemplary embodiments and claims disclosed herein are not limited in their application to the details of construction and arrangement of the components set forth in the description and illustrated in the drawings. Rather, the description and the drawings provide examples of the exemplary embodiments envisioned. The exemplary embodiments and claims disclosed herein are further capable of other exemplary embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based can be readily utilized as a basis for the design of other structures, methods, and systems for carrying out the several purposes of the exemplary embodiments and claims presented in this application. It is important, therefore, that the claims be regarded as including such equivalent constructions.

We claim:

1. A method comprising:

forming free-standing structures of a composition comprising:

initiating physical contact between a template initially distanced from the composition in a viscous state with first flow characteristics by bringing together via movement discrete portions of the template and an upper surface of the composition in a viscous state until the discrete portions of the template are no longer distanced from the composition in a viscous state;

drawing structures of the composition in a viscous state with the first flow characteristics, each structure drawn a structure height defined between:

a structure base portion at which the physical contact is initiated between a respective discrete portion of the template and the upper surface of the composition in a viscous state; and a structure tip portion at a location of contact with the respective discrete portion of the template; and removing physical contact between the respective structure tip portion of each drawn structure of the composition with second flow characteristics from the respective discrete portion of the template;

wherein:

the second flow characteristics of the composition comprise rheological properties that are sufficient to retain the drawn structures as free-standing upon the step of removing physical contact;

one of the first flow characteristics is a first viscosity of the composition in a viscous state, one of the second flow characteristics is a second viscosity of the composition in a viscous state, and the second viscosity is higher than the first viscosity;

a degree of the physical contact between the template and the composition and a shape and/or size of each structure tip portion are each tunable by controlling a dip depth of the discrete portions of the template into the composition in a viscous state and controlling wetting between the discrete portions of the template and the composition in a viscous state; and the tip portions of at least a portion of the free-standing structures each have a shape based at least in part by a respective shape of the location of contact of the respective drawn structure of the composition in a viscous state in prior physical contact with the respective discrete portion of the template.

2. The method of claim 1 further comprising:

tuning an average aspect ratio of the free-standing structures based at least in part on surface tension properties and extensional properties of the composition.

3. The method of claim 1, wherein the template is a patterned template of patterned shapes, the patterned shapes defining the discrete portions of the patterned template;

wherein the initiating physical contact comprises forming a meniscus on the patterned shapes;

wherein the drawing comprises lifting the patterned template while the composition in a viscous state remains in physical contact with the patterned template, the step of lifting forming a respective capillary bridge positioned between a respective structure base portion and a respective structure tip portion, each capillary bridge dynamically supported by both surface tension and viscous forces opposing gravity; and wherein the respective patterned shape of the patterned template is transferred to each structure tip portion in prior physical contact with the patterned template.

4. The method of claim 3, wherein the step of removing comprises application of a release agent to the patterned shapes.

5. The method of claim 1 further comprising:

transitioning from the first flow characteristics of the composition in a viscous state to the second flow characteristics of the composition via a process selected from the group consisting of:

applying UV energy to the composition;

curing the composition;

crosslinking in the composition;

cooling the composition;

removing a solvent of the composition; and a combination thereof;

wherein the composition is a composite material comprising particles selected from the group consisting of microparticles and nanoparticles.

6. The method of claim 5, wherein the particles of the composite material have properties selected from the group consisting of conductivity, magnetism, and optical.

7. The method of claim 1, wherein the discrete portions of the template comprise template structures; and wherein the template structures have at least one of a common shape, a common size, or a common spacing one from another.

8. The method of claim 7, wherein at least one of the template structures has a different shape from another of the template structures.

9. The method of claim 7, wherein at least one of the template structures has a different size from another of the template structures.

10. The method of claim 7, wherein the spacing between at least one set of adjacent template structures is different from the spacing between at least another set of adjacent template structures.

11. The method of claim 1, wherein the step of removing physical contact comprises applying a release agent proximal to the discrete portions of the template.

12. The method of claim 1, wherein at least a portion of the free-standing structures have an aspect ratio of greater than approximately 1.9.

13. The method of claim 1, wherein at least a portion of the free-standing structures have an aspect ratio of greater than approximately 9.6.

14. A method comprising:

drawcasting template-shaped features onto structure tip portions of free-standing structures of a composition comprising:

initiating physical contact between a template initially distanced from the composition in a viscous state with first flow characteristics by moving the template toward the composition in a viscous state until discrete portions of the template having template-shaped features physically contact an upper surface of the composition in a viscous state;

drawing discrete structures of the composition in a viscous state with the first flow characteristics by moving the template away from the upper surface of the composition in a viscous state, each discrete structure drawn a structure height defined between:

a structure base portion proximal to the upper surface of the composition in a viscous state; and a structure tip portion proximal to a respective discrete portion of the moving template and distal from the upper surface of the composition in a viscous state; and removing physical contact between the respective structure tip portion of the drawn structure of the composition with second flow characteristics from the respective discrete portion of the template;

wherein:

the second flow characteristics of the composition comprise rheological properties that are sufficient to retain the structures as free-standing upon the step of removing physical contact;

one of the first flow characteristics is a first viscosity of the composition in a viscous state, one of the second flow characteristics is a second viscosity of the composition in a viscous state, and the second viscosity is higher than the first viscosity;

a degree of the physical contact between the template and the composition and a shape and/or size of each structure tip portion are each tunable by controlling a dip depth of the discrete portions of the template into the composition in a viscous state and controlling wetting between the discrete portions of the template and the composition in a viscous state; and the structure tip portions of the free-standing structures are each drawncast with the template-shaped features of the respective discrete portion of the template.

15. The method of claim 14 further comprising:

tuning an average aspect ratio of the free-standing structures based at least in part on surface tension properties and extensional properties of the composition.

16. The method of claim 15 further comprising:

transitioning from the first flow characteristics of the composition in a viscous state to the second flow characteristics of the composition via a process selected from the group consisting of:

applying UV energy to the composition;

curing the composition;

crosslinking in the composition;

cooling the composition;

removing a solvent of the composition; and a combination thereof.

17. The method of claim 16, wherein the discrete portions of the template have at least one of a common shape, a common size, or a common spacing one from another.

18. The method of claim 17, wherein at least one of:

the removing physical contact comprises fracturing the drawn structure proximal the structure tip portion;

the removing physical contact comprises applying a release agent proximal the structure tip portion;

at least a portion of the free-standing structures have an aspect ratio of greater than approximately 1.9; or at least a portion of the free-standing structures have an aspect ratio of greater than approximately 9.6.

19. A method comprising:

imprinting template-shaped features onto structure tip portions of free-standing structures of a composition comprising:

initiating physical contact between a template initially distanced from the composition in a viscous state with first flow characteristics by moving the template toward the composition in a viscous state until discrete portions of the template having template-shaped features physically contact an upper surface of the composition in a viscous state;

drawing discrete structures of the composition in a viscous state with the first flow characteristics by moving the template away from the upper surface of the composition in a viscous state, each discrete structure drawn a structure height defined between:

a structure base portion proximal to the upper surface of the composition in a viscous state; and a structure tip portion proximal to a respective discrete portion of the moving template and distal from the upper surface of the composition in a viscous state; and removing physical contact between the respective structure tip portion of the drawn structure of the composition with second flow characteristics from the respective discrete portion of the template;

wherein:

the second flow characteristics of the composition comprise rheological properties that are sufficient to retain the structures as free-standing upon the step of removing physical contact;

one of the first flow characteristics is a first viscosity of the composition in a viscous state, one of the second flow characteristics is a second viscosity of the composition in a viscous state, and the second viscosity is higher than the first viscosity;

a degree of the physical contact between the template and the composition and a shape and/or size of each structure tip portion are each tunable by controlling a dip depth of the discrete portions of the template into the composition in a viscous state and controlling wetting between the discrete portions of the template and the composition in a viscous state; and the structure tip portions of the free-standing structures are each imprinted with the template-shaped features of the respective discrete portion of the template.

* * * * *